US009980097B2

(12) United States Patent
Narasimha

(10) Patent No.: US 9,980,097 B2
(45) Date of Patent: *May 22, 2018

(54) METHOD AND APPARATUS FOR INDOOR LOCATION ESTIMATION AMONG PEER-TO-PEER DEVICES

(71) Applicant: MOTOROLA MOBILITY LLC, Chicago, IL (US)

(72) Inventor: Murali Narasimha, Vernon Hills, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 79 days.

This patent is subject to a terminal disclaimer.

(21) Appl. No.: 15/044,371

(22) Filed: Feb. 16, 2016

(65) Prior Publication Data

US 2016/0337809 A1 Nov. 17, 2016
US 2017/0339527 A9 Nov. 23, 2017

Related U.S. Application Data

(60) Provisional application No. 62/162,645, filed on May 15, 2015, provisional application No. 62/162,780, filed on May 17, 2015.

(51) Int. Cl.
*H04W 4/04* (2009.01)
*H04L 12/26* (2006.01)
(Continued)

(52) U.S. Cl.
CPC ................ *H04W 4/04* (2013.01); *G01S 5/02* (2013.01); *H04L 43/0852* (2013.01); *H04L 67/104* (2013.01)

(58) Field of Classification Search
CPC .... H04L 43/106; H04L 67/104; H04W 24/08; H04W 24/10; H04W 4/04
(Continued)

(56) References Cited

U.S. PATENT DOCUMENTS 7,079,025 B2 * 7/2006 Michalson ........... G01C 21/206
340/539.1
7,126,951 B2 * 10/2006 Belcea .................. G01S 5/0252
370/400

(Continued)

FOREIGN PATENT DOCUMENTS

WO 02/15614 A1 2/2002
WO 2011/144795 A1 11/2011

OTHER PUBLICATIONS

Savarese, C.; Rabaey, J.M.; Beutel, J.: "Location in distributed ad-hoc wireless sensor networks", Acoustics, Speech, and Signal Processing, 2001. Proceedings. (ICASSP '01), 2001 IEEE International Conference on (vol. 4), pp. 2037-2040 vol. 4.

(Continued)

*Primary Examiner* — Babar Sarwar

(57) ABSTRACT

Methods and apparatus perform location estimation among peer-to-peer devices. For the various methods, data of several different types, such as received signal strength, timing measurements, time stamps, actual transmit power, etc., is measured, stored, and propagated within a peer-to-peer network to enable each device in the peer-to-peer network to calculate positioning coordinates for one or more devices having unknown positioning coordinates.

17 Claims, 13 Drawing Sheets

(51) Int. Cl.
 *H04L 29/08* (2006.01)
 *G01S 5/02* (2010.01)
(58) Field of Classification Search
 USPC .... 455/404.2, 412.1–414.2, 418–422.1, 436,
 455/444, 435.2–435.3, 440, 443, 552.1,
 455/456.1, 456.2, 456.3, 457, 41.1–41.2,
 455/550.1, 561; 370/328, 338
 See application file for complete search history.

(56) References Cited

U.S. PATENT DOCUMENTS

| | | | | | |
|---|---|---|---|---|---|
| 8,531,288 | B1* | 9/2013 | Khan | ................ | H04W 4/02 340/10.1 |
| 2004/0203380 | A1* | 10/2004 | Hamdi | ................ | G01S 5/0289 455/41.2 |
| 2005/0020275 | A1* | 1/2005 | Agrawala | ................ | G01S 5/02 455/456.1 |
| 2006/0267841 | A1* | 11/2006 | Lee | ................ | G01S 5/0081 342/463 |
| 2011/0163914 | A1* | 7/2011 | Seymour | ................ | G01S 19/05 342/357.42 |
| 2012/0184287 | A1* | 7/2012 | Jovicic | ................ | G01S 5/0009 455/456.1 |
| 2013/0295954 | A1* | 11/2013 | Hamalainen | ................ | G01S 5/0289 455/456.1 |
| 2015/0018017 | A1* | 1/2015 | Jang | ................ | G01S 5/0284 455/456.5 |

OTHER PUBLICATIONS

Patwari, N. et al: "Locating the nodes: cooperative localization in wireless sensor networks", Signal Processing Magazine, IEEE, (vol. 22, Issue: 4, pp. 54-69.

Patwari, N. et al.: "Relative location estimation in wireless sensor networks", Signal Processing, IEEE Transactions on (vol. 51, Issue: 8), pp. 2137-2148.

Patwari, N. et al.: "Relative location in wireless networks", Vehicular Technology Conference, 2001, VTC 2001 Spring, IEEE VTS 53rd (vol. 2), pp. 1149-1153 vol. 2.

International Search Report and Written Opinion for WO Application PCT/US2016/027040 dated Jul. 19, 2016.

* cited by examiner

FIG. 5

| | RSS | DEVICE 1 TIME-STAMP | RSS | DEVICE 2 TIME-STAMP | RSS | DEVICE 3 TIME-STAMP | RSS | DEVICE 4 TIME-STAMP |
|---|---|---|---|---|---|---|---|---|
| DEVICE 1 | | ✗ | $RSS_{12}$ | $TS_{12}$ | $RSS_{13}$ | $TS_{13}$ | $RSS_{14}$ | $TS_{14}$ |
| DEVICE 2 | $RSS_{21}$ | $TS_{21}$ | | ✗ | $RSS_{23}$ | $TS_{23}$ | $RSS_{24}$ | $TS_{24}$ |
| DEVICE 3 | $RSS_{31}$ | $TS_{31}$ | $RSS_{32}$ | $TS_{32}$ | | ✗ | $RSS_{34}$ | $TS_{34}$ |
| DEVICE 4 | $RSS_{41}$ | $TS_{41}$ | $RSS_{42}$ | $TS_{42}$ | $RSS_{43}$ | $TS_{43}$ | | ✗ |

| | DEVICE1 802 | DEVICE2 804 | DEVICE3 806 | DEVICE4 808 |
|---|---|---|---|---|
| FRAME TIME OFFSET (W.R.T REFERENCE) 810 | TPROP1 | TPROP2 | TPROP3 | TPROP4 |
| | MEASURED TIME OFFSET OF DEVICE 1'S TRANSMISSION | MEASURED TIME OFFSET OF DEVICE 2'S TRANSMISSION | MEASURED TIME OFFSET OF DEVICE 3'S TRANSMISSION | MEASURED TIME OFFSET OF DEVICE 4'S TRANSMISSION |
| DEVICE 1 812 | X | T_Rx_21 | T_Rx_31 | T_Rx_41 |
| DEVICE 2 814 | T_Rx_12 | X | T_Rx_32 | T_Rx_42 |
| DEVICE 3 816 | T_Rx_13 | T_Rx_23 | X | T_Rx_43 |
| DEVICE 4 818 | T_Rx_14 | T_Rx_24 | T_Rx_34 | X |

FIG. 8

METHOD AND APPARATUS FOR INDOOR LOCATION ESTIMATION AMONG PEER-TO-PEER DEVICES

RELATED APPLICATIONS

The present application is related to and claims benefit under 35 U.S.C. § 119(e) from U.S. Provisional Patent Application Ser. No. 62/162,645, filed May 15, 2015 and 62/162,780 filed May 17, 2015, both titled "Method and Apparatus for Indoor Location Estimation Among Peer-to-Peer Devices", which are commonly owned with this application by Motorola Mobility LLC, the entire contents of which are incorporated herein by reference.

FIELD OF THE DISCLOSURE

The present disclosure relates generally to determining device positioning and more particularly to indoor location estimation among peer-to-peer devices.

BACKGROUND

Indoor positioning has many applications and is of commercial interest to many businesses. Additionally, many software applications on mobile devices, such as smartphones, use positioning data. Thus, a user's indoor experience with her device could be degraded where access to positioning data is limited.

Current technology has shortcomings for use in indoor positioning. For example, a Global Positioning System (GPS) does not work well indoors, and the accuracy of GPS is limited to several meters. Alternative approaches such as performing Observed Time Distance of Arrival (OTDOA) measurements using beacons transmitted from antennas placed on buildings have been considered, but tend to be expensive. Other solutions require the use of servers and in some instances the use of ad-hoc networks, but these solutions tend to have many limitations as well.

BRIEF DESCRIPTION OF THE FIGURES

The accompanying figures, where like reference numerals refer to identical or functionally similar elements throughout the separate views, form part of the specification and illustrate embodiments in accordance with the included claims.

FIG. 5 is a data structure containing data used for performing location estimation among peer-to-peer devices in accordance with the second embodiment.

FIG. 8 is a data structure containing data used for performing location estimation among peer-to-peer devices in accordance with the third embodiment.

Figure 1:
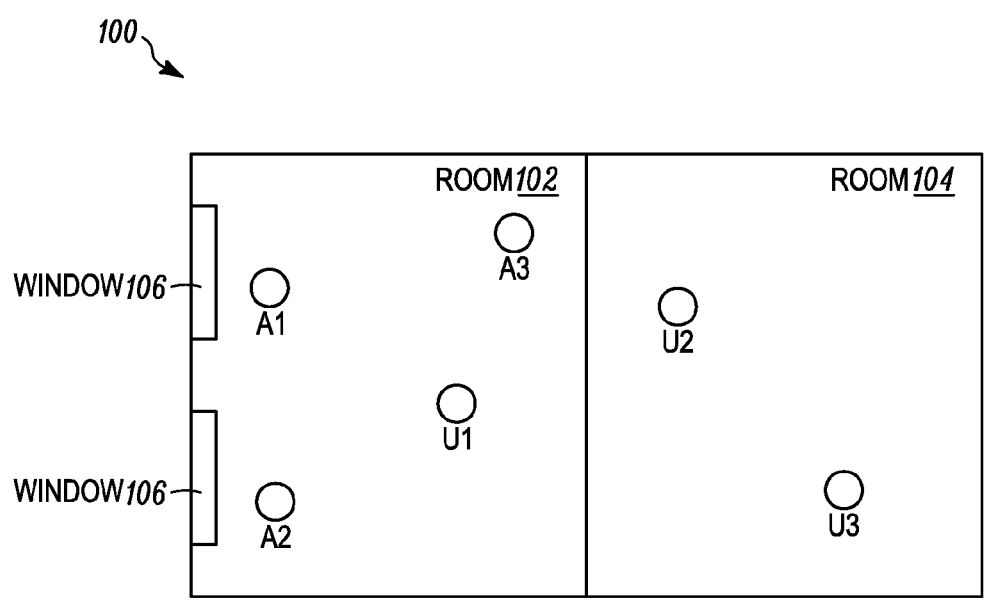
FIG. 1 is a schematic diagram illustrating an indoor environment containing multiple devices, at least some of which are peer-to-peer devices configured to perform methods for location estimation in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

The apparatus and method components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to various embodiments described herein, the present disclosure provides a method and apparatus for performing location estimation among peer-to-peer devices (or simply peer devices), which, as used herein, are devices that are equipped to collect and exchange measurement data, such as received signal strength, transmit power, and timing measurement data, used to perform the location estimation. The peer-to-peer devices communicate directly, i.e., without the aid of an infrastructure device such as a cellular base station or a WiFi access point, using a device-to-device protocol such as WiFi Direct or LTE Direct. Peer-to-peer devices can be anchor devices having known positioning coordinates or can have unknown positioning coordinates determined using the embodiments described herein. Furthermore, peer-to-peer devices may or may not have access point functionality and can be mobile or fixed, such as an Internet of Things (IoT) device. Multiple peer-to-peer devices form a peer-to-peer network for communicating.

For the various methods, data of several different types, such as Received Signal Strength (RSS), timing measurements, time stamps, actual transmit power, etc., is measured, stored, and propagated within the peer-to-peer network to enable each peer-to-peer device to calculate unknown positioning coordinates for one or more peer-to-peer devices in the network. In other embodiments, the data collected by the peer-to-peer devices can be provided to a device that is not part of the peer-to-peer network, such as a server, for use in determining the unknown positioning coordinates. Positioning coordinates are an indication of a spatial location and can have any suitable form including, but not limited to, Cartesian coordinates, polar coordinates, latitude and longitude indices, etc. Indicators of spatial location are also referred to herein as location indications.

FIG. 1 illustrates an environment 100 in which multiple devices are configured to operate to determine positioning coordinates in accordance with the present teachings. As shown, environment 100 is an indoor environment with multiple rooms, e.g., a room 102 and a room 104. Environment 100 can be a commercial or business establishment or a residential home, for instance. Other example environments include a mall, a sporting arena, etc. Illustrated in the environment 100 are six devices including anchor devices A1, A2, and A3 and another device U1 in room 102 and devices U2 and U3 in room 104.

The anchor devices A1, A2, and A3, by definition, have known positioning coordinates. For example, the anchor devices can be mobile devices that are able to obtain adequately reliable GPS coordinates, for instance the anchor devices A1 and A2 are located near windows 106. Alternatively or additionally, the anchor devices can be WiFi access points or small cellular base stations. By contrast, the positioning coordinates of the three other non-anchor devices U1, U2, and U3 are unknown but can be determined using one or more of the embodiments described herein. Illustratively, at least devices U1, U2, and U3 are peer-to-peer devices that form a peer-to-peer network used to facilitate the determination of their positioning coordinates. The anchor devices A1, A2, and A3 can also be a part of the peer-to-peer network where they are, for instance, mobile devices or IoT devices.

FIGS. 2, 3, 4, and 5 illustrate two embodiments for performing location estimation for devices having unknown positioning coordinates using mutual measurements of RSS. Both embodiments are, for instance, directed to a method performed by a first peer-to-peer device, for example using a processor and set of one or more transceivers that are operatively coupled. The method, in general, includes taking a first set of received signal strength measurements for a first set of signals received from at least one device within a group of devices (that includes the first peer-to-peer device and a remaining number of peer-to-peer devices) and recording a first set of time stamps that indicate when the first set of received signal strength measurements were taken. A set includes one or more elements.

The method further includes sending the first set of received signal strength measurements and corresponding first set of time stamps for propagating to the remaining peer-to-peer devices and receiving a second set of received signal strength measurements taken by the remaining peer-to-peer devices and a second set of time stamps that indicate when the second set of received signal strength measurements were taken. Furthermore, the method includes determining unknown positioning coordinates for at least one peer-to-peer device in the group of devices using at least the first and second sets of received signal strength measurements and the first and second sets of time stamps by, wherein the determining includes correlating the measurements in the first and second sets of received signal strength measurements using the first and second sets of time stamps to define constraints on distances between pairs of devices in the group of devices.

The unknown positioning coordinates can be further determined using known positioning coordinates of multiple devices in the group of devices. Beneficially, the second set of received signal strength measurements can include measurements taken by one or more of the remaining peer-to-peer devices of signals sent by one or more of the other remaining peer-to-peer devices, which improves the accuracy of the location estimations.

For a similar method performed by a communication device, such as a server, which does not take RSS or other measurements, a method can include receiving, for multiple peer-to-peer devices of a group of devices, correlated measurements of first and second sets of received signal strength measurements, which were correlated using first and second sets of time stamps. The first and second sets of received signal strength measurements and first and second sets of time stamps were propagated through the group of devices by each peer-to-peer device performing as a first peer-to-peer device. The method further includes determining unknown positioning coordinates for at least one peer-to-peer device in the group of devices using at least the first and second sets of received signal strength measurements and the first and second sets of time stamps by defining constraints on distances between pairs of devices in the group of devices using the correlated measurements of the first and second sets of received signal strength measurements.

The peer-to-peer devices can take RSS measurements and propagate the measurements and corresponding timestamp data by taking the first set of received signal strength measurements for a first set of signals received from at least one device within the group of devices that includes the first peer-to-peer device and a remaining number of peer-to-peer devices and recording the first set of time stamps that indicate when the first set of received signal strength measurements were taken. The peer-to-peer devices further receive the second set of received signal strength measurements taken by the remaining peer-to-peer devices and the second set of time stamps that indicate when the second set of received signal strength measurements were taken, wherein the second set of received signal strength measurements includes measurements taken by one or more of the remaining peer-to-peer devices of signals sent by one or more of the other remaining peer-to-peer devices.

Figure 2:
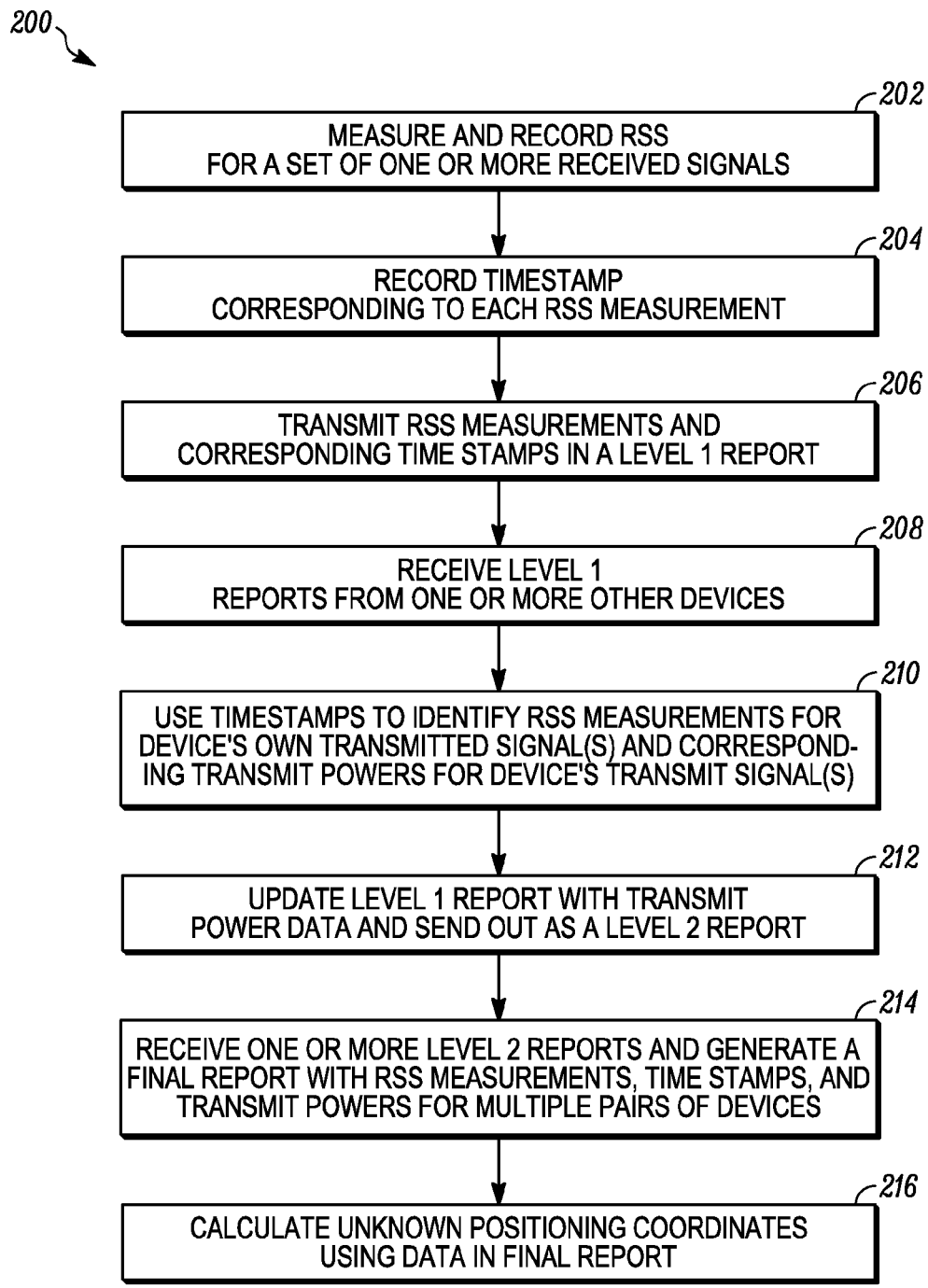
FIG. 2 is a flow diagram illustrating a method for location estimation among peer-to-peer devices in accordance with a first embodiment.

For a first embodiment illustrated by reference to FIGS. 2 and 3, correlating the measurements in the first and second sets of received signal strength measurements using the first and second sets of time stamps includes identifying, for multiple pairs of devices some of which include the first peer-to-peer device, a correlation between: (1) a RSS measurement taken by one peer-to-peer device in the pair of a signal transmitted by the other peer-to-peer device in the pair; and (2) a transmit power recorded for the a signal transmitted by the other peer-to-peer device. For each pair of devices, distance between the pairs of devices is constrained based on the correlated RSS measurements and transmit powers.

For a second embodiment illustrated by reference to FIGS. 4 and 5, correlating the measurements in the first and second sets of received signal strength measurements using the first and second sets of time stamps includes comparing the first set of time stamps and the second set of time stamps to identify received signal strength measurements that overlap in time. For one example, the overlapping measurements are taken for a signal sent from the first peer-to-peer device and are taken by two or more of the other peer-to-peer devices, and constraints on distances between the first peer-to-peer device and the two or more of the other peer-to-peer devices are defined using the overlapping measurements. For another example, the overlapping measurements are taken for a signal sent from a second peer-to-peer device and are taken by two or more of the other peer-to-peer devices, and constraints on distances between the second peer-to-peer device and the two or more of the other peer-to-peer devices are defined using the overlapping measurements.

As mentioned above, FIGS. 2 and 3 illustrate a first embodiment for performing location estimation for devices having unknown positioning coordinates, wherein RSS and transmit power measurements between multiple pairs of devices, some of which are anchors, are used to determine positioning coordinates of the non-anchor devices. The resulting procedure minimizes errors in calculated positioning coordinates due to errors in individual RSS measurements. For this first embodiment, distances between device pairs can be estimated from a path-loss determined by the devices, which is calculated from a measured RSS and a recorded actual (as opposed to assumed) transmit power of a signal transmitted by one device in the pair and received by the other device.

As used herein, RSS is the power of a wireless signal as measured by a device receiving the signal and can be expressed in dBm or milliwatts. Actual transmit power is the power at which a wireless signal is transmitted, and can be expressed in dBm or milliwatts. The phrases "transmit power" and "actual transmit power" are used herein interchangeably. The RSS measurement can be of any suitable signal, for instance, a Received Signal Strength Indication (RSSI) measurement of a broadcasted WiFi beacon or a Reference Signal Received Power (RSRP) measurement of a Long-Term Evolution (LTE) signal.

For purposes of the calculations that are illustrated herein, a two-dimensional Cartesian coordinate system is assumed, which uses coordinates of the form (x, y) to indicate position. As such, equation/function (1) below can be used to calculate Euclidian distance (d) between two devices with Cartesian coordinates (x1, y1) and (x2, y2), $$d=[(x2-x1)^2+(y2-y1)^2]^{1/2}. \qquad (1)$$

When the distance is known or estimated, a system of equations each derived from equation (1) can be used to solve for unknown positioning coordinates or, in other words, positioning coordinates (or simply coordinates) of non-anchor devices. In other embodiments, a suitable system of equations can be determined based on a similar known distance equation applicable to a three-dimensional Cartesian coordinate system. In further embodiments, other positioning coordinate representations, e.g., latitude and longitude, are translated into Cartesian coordinates and the embodiments applied.

For the first embodiment, all of the anchor devices whose coordinates are used to construct the system of equations and all of the non-anchor peer-to-peer devices whose coordinates are being determined are capable of taking RSS measurements of a signal, such as a broadcast signal. For the present illustration, a group of devices performing RSS measurements and propagating RSS and transmit power data includes at least three anchor devices and all of the non-anchor devices for which the positioning coordinates are being determined. For an implementation, all the anchor and non-anchor devices having coordinates both known and estimated by the system of equations are part of a same peer-to-peer network to propagate the relevant data. For one or more of the embodiments described by reference to FIGS. 2-10, a device, such as a group owner of a WiFi Direct peer-to-peer network, sends an indication or order to cause a synchronized performance of the disclosed location mechanisms by the peer and anchor devices.

Turning again to FIG. 2, each peer-to-peer device of a peer-to-peer network, e.g., some or all of the devices A1, A2, A3, U1, U2, U3, can perform at least a portion of a method 200 illustrated therein to facilitate determining the positioning coordinates of one or more of U1, U2, and U3. For ease of discussion only, during the time a given peer-to-peer device performs at least part of the method 200 (or any other method described herein capable of being performed by a peer-to-peer device), the device is, in some instances, referred to as a "first" peer-to-peer device.

For a particular implementation, each peer-to-peer device in the above-described peer-to-peer network of devices broadcasts a signal, records the time and transmit power at which the signal was broadcasted, and performs at least a portion of the remaining functionality of the method 200. Particularly, the device, at 202, measures and records a RSS for each broadcast signal that it "hears" or, in other words, each broadcast signal that it can detect and take the relevant measurements. The device further records 204 a timestamp indicating the time at which it took each RSS measurement.

The device then transmits 206, e.g., broadcasts, the RSS measurements and corresponding time stamps in a data structure referred to herein as a "level 1" report, which in this case has no transmit power data. The level 1 report can be stored in memory as a table for example. The device in-turn receives 208 level 1 reports from one or more other devices in the peer-to-peer network.

From the received level 1 report(s), the device, at 210, uses the timestamps associated with the received RSS measurements to identify the RSS measurements taken on its own broadcast signal. Accordingly, the device updates 212 its level 1 report to include and associate its transmit power data with the identified RSS measurements. The device broadcasts the updated level 1 report as a "level 2" report since it now includes transmit power data. Accordingly, blocks 210 and 212 form the process, referred to earlier, of correlating RSS and transmit power measurement data for multiple device pairs.

When the device receives 214 one or more level 2 reports, it generates a final report that includes, for instance, RSS measurements and timestamps and corresponding transmit power data for all of the devices in the peer-to-peer network. When the device receives a single level 2 report, it can update the received report with its own RSS and timestamp data to generate the final report. In a different scenario, the device receives multiple level 2 reports and "unifies" the data into a single final report. The device, for instance a non-anchor device, calculates 216 its own positioning coordinates and those of the other non-anchor devices.

Figure 3:
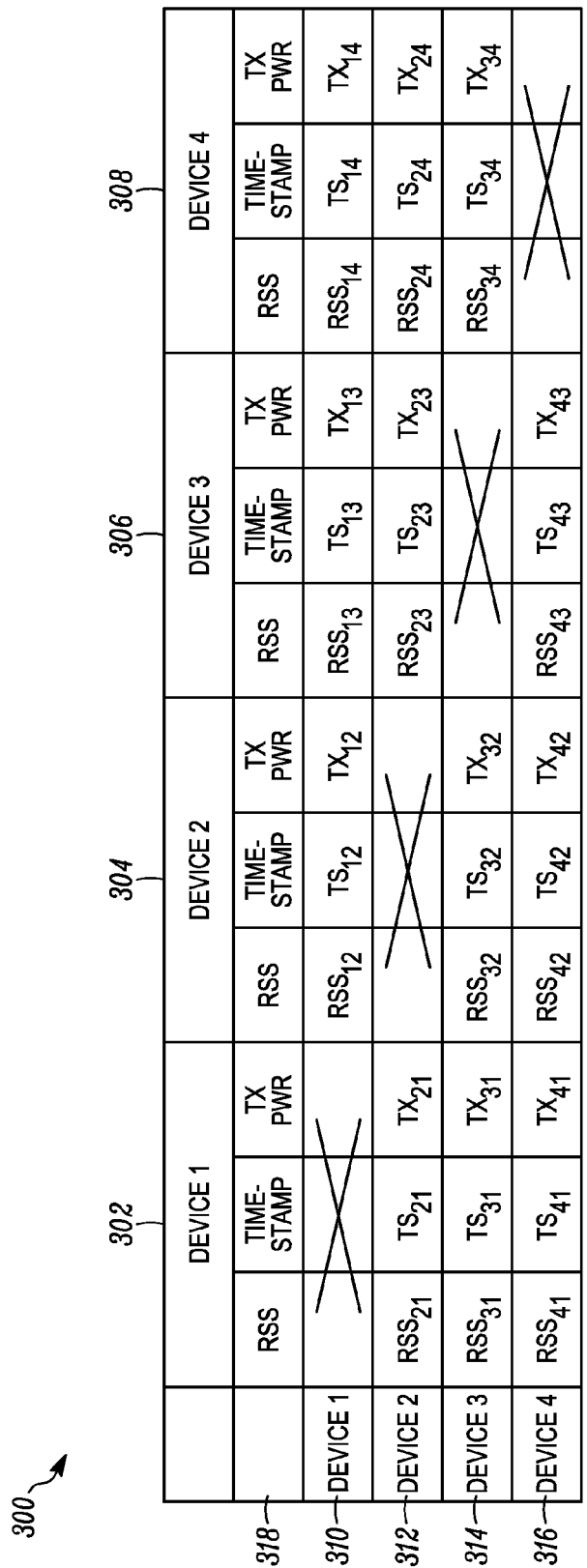
FIG. 3 is a data structure containing data used for performing location estimation among peer-to-peer devices in accordance with the first embodiment.

FIG. 3 illustrates an example partial final report depicted as a table 300, which includes some of the data that can be used by the non-anchor devices to calculate their positioning coordinates. A row 318 of the table 300 identifies the type of data, RSS, TX Power, and time-stamp, recorded for each device, e.g., device 1, device 2, device 3, and device 4 identified in the table 300. Table 300 further includes columns 302, 304, 306, and 308 and rows 310, 312, 314, and 316 corresponding to each device. Each row heading indicates one device's RSS measurements and corresponding timestamps taken on signals sent by the other three devices, as indicated by the device in the intersecting column heading. Also recorded in each row is the transmit power when the RSS measurement was taken. Accordingly, the intersecting columns 302, 304, 306, and 308 and rows 310, 312, 314, and 316 depict peer-to-peer device pairs having first (D1) and second (D2) devices where, for a given timestamp, an RSS measurement was taken by the first device of a signal broadcast at a recorded transmit power by the second device.

For example, row 310 shows the RSS measurements taken by device 1 at the indicated timestamps, and the intersecting columns 304, 306, and 308 indicate the devices that transmitted the signals at the recorded time stamps and the corresponding actual transmit power when the signal was broadcast. For a further example, for the device pair of device 1 and device 2 shown at the intersection of column 304 and row 310, at timestamp $TS_{12}$, device 2 transmitted a signal at a transmit power of $TX_{12}$ for which device 1 took an RSS measurement of $RSS_{12}$.

To determine, at 216, the unknown positioning coordinates for the non-anchor nodes in the network, a calculating device (which can be a peer-to-peer device, an anchor device, a non-anchor device, a server) having access to the data in the final report, e.g., the table 300, can determine multiple device pairs, each having different combinations of first and second devices from the final report. For each device pair, the calculating device determines the distance between the two devices in the pair. This can be done as a function of the correlated RSS measurement and the transmit power recorded in a row/column intersection of the table 300, for example using equation (2) below, $$TX - RSS = 10n \log_{10} d \qquad (2),$$

where TX is the transmit power, RSS is the RSS measurement, d is the distance between the two devices in the pair, and n is a path-loss exponent that is either known, e.g., determined beforehand and stored, or can be solved as an unknown in a system of equations. In general, equation (2) is used to define constraints on distances between pairs of devices in the group of devices using overlapping RSS measurements and transmit power recordings that were correlated using recorded time stamps.

Knowing the distance between the devices in the pair, equation (1) can be constructed using the coordinates for the devices in the pair. For multiple device pairs (e.g. containing an anchor device and a non-anchor device or containing two non-anchor devices), a system of similar equations is constructed using equation (1) and the calculated distances and coordinates of the anchor devices to determine the coordinates of the non-anchor devices. The system of equations can be solved using mathematical optimization techniques.

For three non-anchor devices and three anchor devices, a system of nine equations can be used to solve for the coordinates of the non-anchor devices in a two-dimensional Cartesian coordinate system. However, including additional equations in the system of equations improves the accuracy of the results. An example benefit is that although each peer-to-peer device in the group of devices may not be able to hear all of the devices in the group, the RSS and transmit data used to calculate all of the unknown coordinates for devices in the group can be propagated to every device in the group and to servers, if desired, to perform the calculations.

Figure 4:
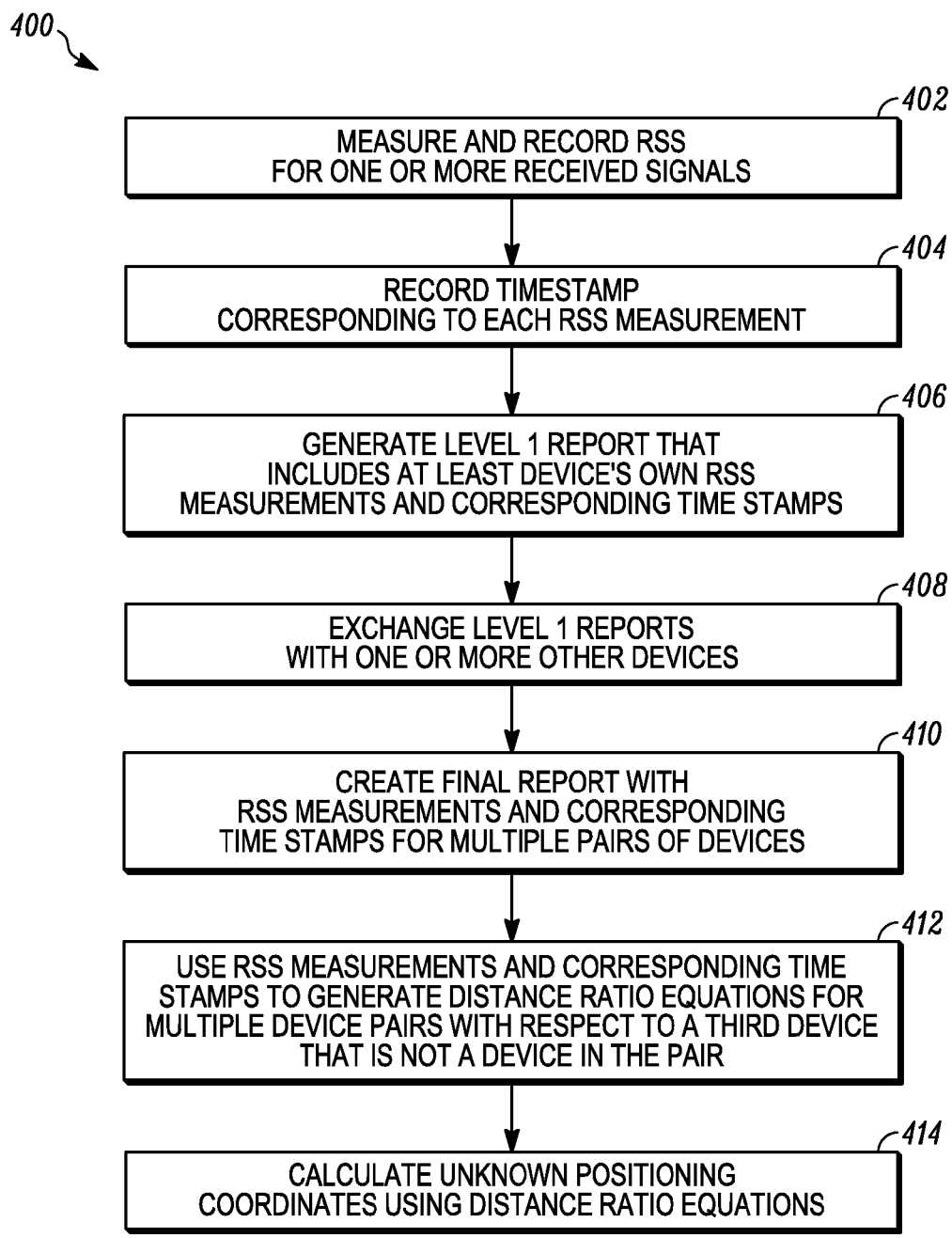
FIG. 4 is a flow diagram illustrating a method for location estimation among peer-to-peer devices in accordance with a second embodiment.

FIGS. 4 and 5 illustrate a second embodiment for performing location estimation for devices having unknown positioning coordinates based on distance equation ratios. In many situations, it is difficult or impossible to accurately determine the transmit power of a device. For example, an anchor device whose positioning coordinates can be used to estimate unknown positioning coordinates may not be part of the peer-to-peer group, such as in the case of fixed WiFi access points or small cell base stations. It is generally very difficult to determine the transmit power of such devices at a given point in time. However, having fixed devices such as access points and small cell base stations act as anchor devices is likely to be a relatively common occurrence because of the widespread availability of networks that contain these fixed devices and because many times positioning coordinates of these fixed devices are known.

Therefore, in the second embodiment, a ratio of distances is estimated to a given anchor device, instead of distance estimates to the anchor device. This makes it unnecessary to know the actual transmit powers. For a particular implementation scenario, the duration over which devices perform RSS measurements and averaging is fixed for all the devices in the group, and RSS is recorded in decibels.

FIG. 4 is a flow diagram illustrating a method 400 for location estimation among peer-to-peer devices in accordance with the second embodiment. The location estimation procedure can be started based on an indication or order from the group owner device. A common time reference is assumed, for instance timing provided by the group owner device or a synchronization source in an LTE peer-to-peer (D2D) group. In general, each device performs an RSS measurement of one or more signals, e.g., a signal from each nearby peer or anchor device. Particularly, for each signal received, the device measures and records 402 the RSS of that specific signal and records 404 a timestamp corresponding to the start of the measurement duration.

Devices construct 406 and transmit 408 level 1 measurement reports having their measured RSS and timestamps. The devices create 410 a final report with RSS measurements and corresponding time stamps for multiple pairs of devices. For example, if the device has not received any measurement reports, it creates a new measurement report having the recorded RSS measurements and the timestamps for each peer. If the device has received one or more measurement reports, it creates a union of the measurement reports. It inserts its recorded measurements into the report for each peer to create 410 the final measurement report that is transmitted. Each device furthermore determines which of its peers are anchors, and determines the coordinates of those anchors. Each device uses the RSS measurements and time stamps contained in the final report to perform, at 412 and 414, computations to estimate the unknown coordinates.

For this embodiment, each peer-to-peer device serves as a first peer-to-peer device that transmits a first set of RSS measurements and corresponding first set of time stamps and receives a second set of RSS measurements and corresponding second set of time stamps taken by other peer-to-peer devices in the group. The second sets of measurements and time stamps can be taken for a signal sent by the first peer-to-peer devices or could be taken for signals sent between the remaining peer-to-peer devices. For this embodiment, correlating the measurements in the first and second sets of received signal strength measurements using the first and second sets of time stamps includes comparing the first and second sets of time stamps to identify multiple device trios each having a different combination of first, second, and third devices of the group of devices, wherein the first and second devices took received signal strength measurements, of a signal sent by the third device, which overlap in time. In other words, the overlapping RSS measurements can be taken by two or more of the other peer-to-peer devices of a signal sent from one peer-to-peer device. Alternatively, the overlapping RSS measurements can be taken by two or more peer-to-peer devices of a signal sent by a fixed device.

FIG. 5 illustrates a portion of an example final report 500 that can be stored and used to perform 412, 414 the calculations to estimate the unknown positioning coordinates. Structure 500 includes four columns 502, 504, 506, 508 and five rows 510, 512, 514, 516, and 518. The row 518 identifies the type of data, RSS and time-stamp, recorded for each of four devices included therein, device 1, device 2, device 3, and device 4 in the four rows, respectively. Accordingly, each row heading indicates a different one of the devices that takes RSS measurements at the recorded timestamp for signals send by the other three devices as indicated by the column heading. The data in this table 500 can be analyzed, e.g., by one or more of the peer-to-peer devices or a server for instance, to identify the device trios and use the correlated RSS measurement data to determine unknown positioning coordinates.

For this second embodiment, the unknown positioning coordinates can be determined based on a difference between the overlapping received signal strength measurements associated with each identified device trio. For example, the peer-to-peer device or server determines, for each identified device trio and as a function of the difference between the overlapping received signal strength measurements, a distance ratio of a distance between the second and third devices to a distance between the first and third devices. The unknown positioning coordinates are determined based on the distance ratios. The function can be the equation (3) indicated below.

For one particular embodiment, the computation 412, 414 of coordinates for the non-anchor devices is performed using three major steps. First, a device pair (D1, D2) is identified such that measurements performed by both D1 and D2 of another device D3 over the same time period are available. Measurements are considered to have been performed over the same time period if the timestamps of the measurements are sufficiently close, thereby, indicating a large overlap in the durations for the measurements.

Second, for each such device trio (D1, D2, D3), an equation is generated as follows. The difference of RSS of D3 at D1 and the RSS of D3 at D2 is computed as $\Delta RSS_{D3}$. A distance ratio $r=d_{13}/d_{23}$ is estimated from $\Delta RSS_{D3}$ using the following equation (3)

$$\Delta RSS_{D3} = 10n \log_{10}(d_{23}/d_{13}). \quad (3),$$

where $\Delta RSS_{D3}$ is the difference between the overlapping received signal strength measurements, $d_{23}/d_{13}$ is the distance ratio, and n is a path-loss exponent. This requires the selection of an appropriate value of the path-loss exponent n. Take $(x_{D1}, y_{D1})$ and $(x_{D2}, y_{D2})$ as the (unknown) coordinates of D1 and D2 and $(x_{D3}, y_{D3})$ as the coordinates of D3. If D3 is an anchor device, $(x_{D3}, y_{D3})$ are known; otherwise, $(x_{D3}, y_{D3})$ are unknown. The equation to be satisfied is written (based on equation (1)) as the equation (4):

$$\sqrt{(x_{D1} - x_{D3})^2 + (y_{D1} - y_{D3})^2} - r\sqrt{(x_{D2} - x_{D3})^2 + (y_{D2} - y_{D3})^2} = 0. \quad (4)$$

Third, an optimization approach is used to obtain estimates for the coordinates of the non-anchor devices by correlating RSS measurements using timestamp data to define constraints on distances between pairs of devices in the group of devices.

Figure 6:
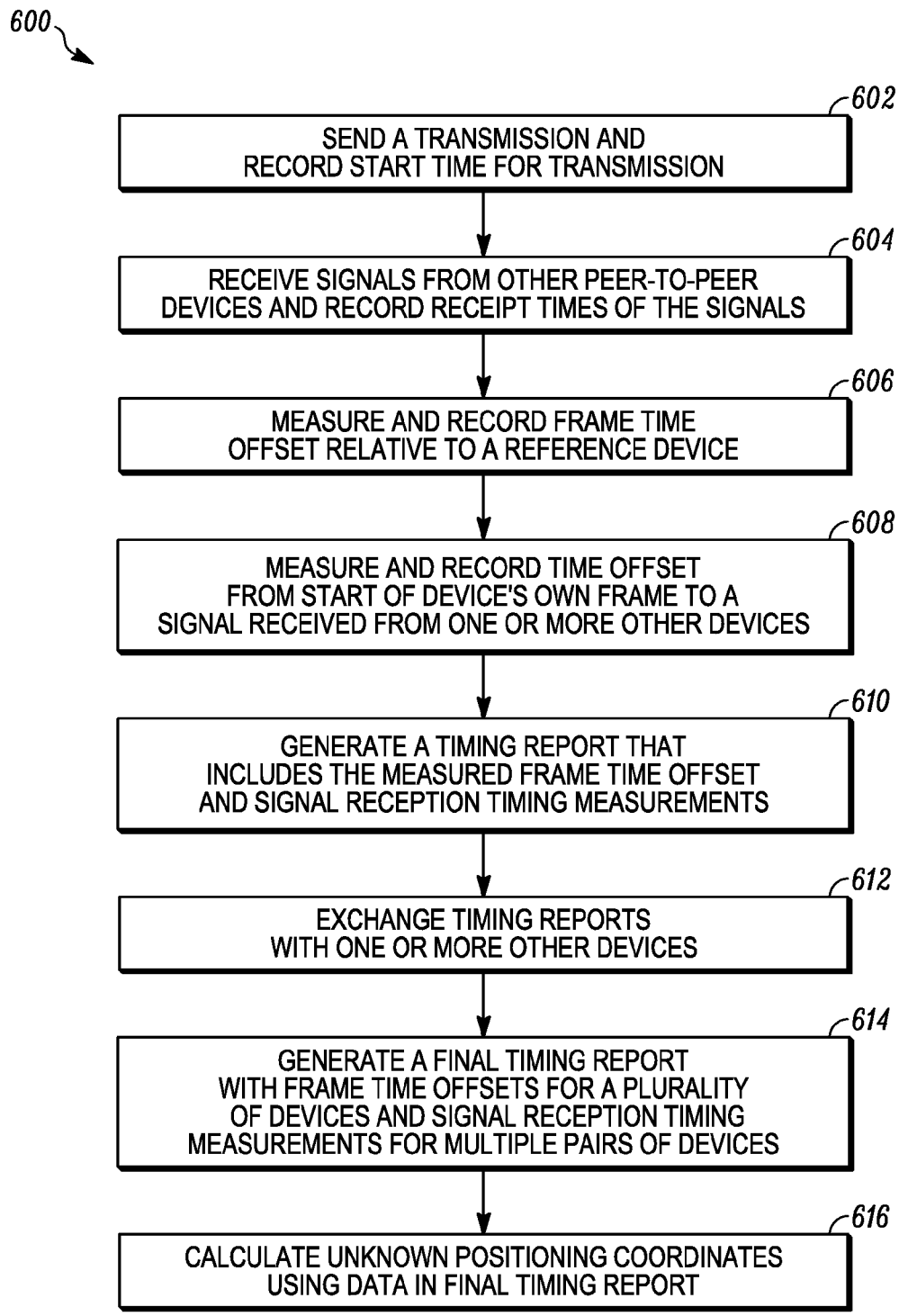
FIG. 6 is a flow diagram illustrating a method for location estimation among peer-to-peer devices in accordance with a third embodiment.
Figure 7:
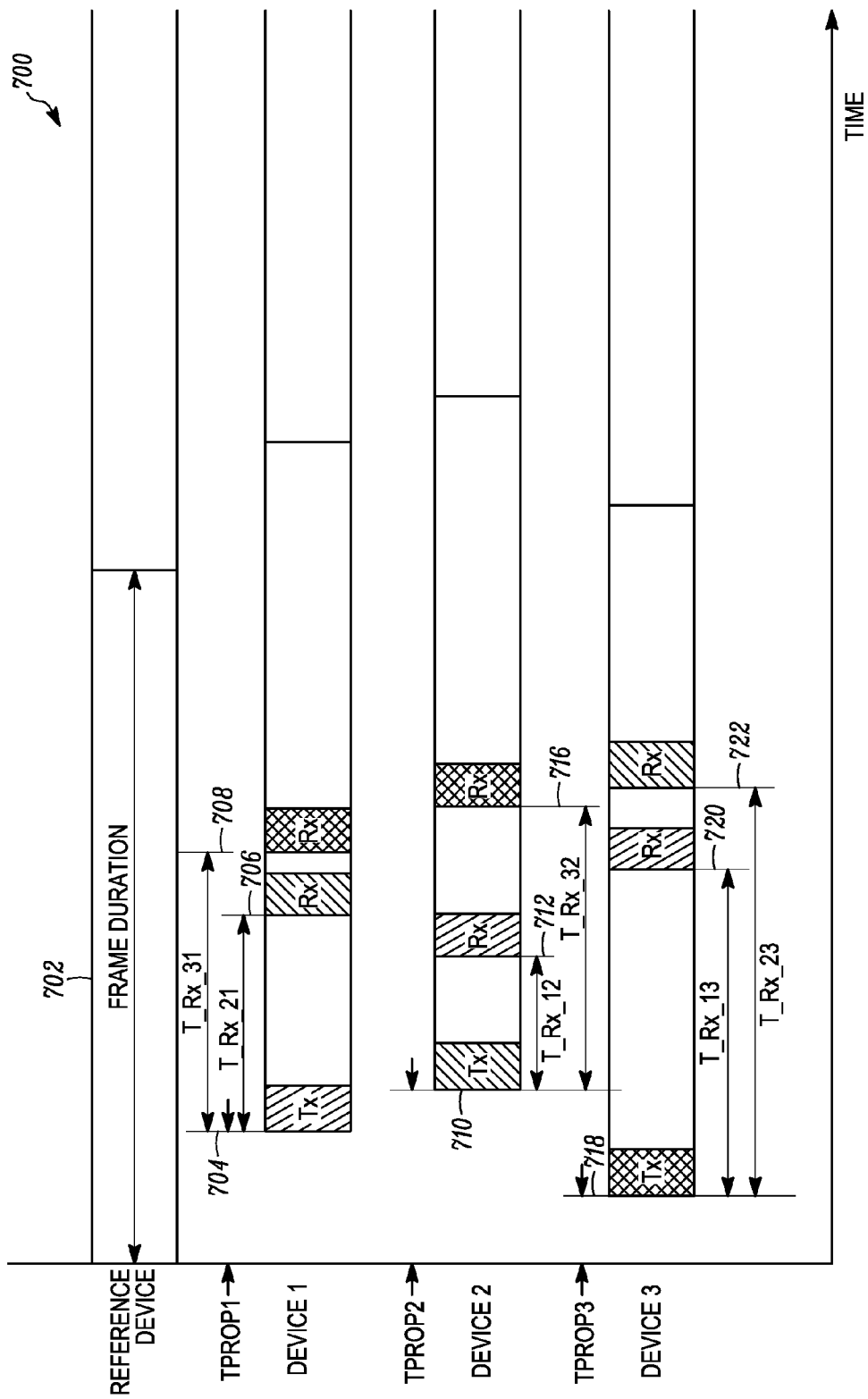
FIG. 7 is a timing diagram illustrating timing data used for performing location estimation among peer-to-peer devices in accordance with the third embodiment.

FIGS. 6, 7, and 8 illustrate a third embodiment for performing location estimation based on mutual measurement of timing. If the devices are capable of sufficiently accurate timing measurements, location estimation can be performed based on timing measurements. Such a mechanism uses timing measurements between multiple pairs of devices to determine the coordinates of the non-anchor devices. The resulting procedure minimizes the errors in calculated positioning coordinates due to errors in individual timing measurements.

FIG. 6 illustrates a method 600 that can be performed by each "first" peer-to-peer device in the peer-to-peer network to determine unknown positioning coordinates, according to the third embodiment. The method 600 facilitates determining, for multiple pairs of devices, a propagation delay between each pair of devices to use as a constraint on the distance between the devices in the pair. Set of equations can then be constructed, for instance, using equation (1) to calculate or determine unknown positioning coordinates for one or more non-anchor devices.

In accordance with the method 600, each peer-to-peer device sends 602 a transmission, e.g., a frame, and records the time of sending the transmission. Each peer-to-peer device also receives 604 a set of one or more of the transmissions (signals) of the other peer-to-peer devices and records the time of receipt of each received signal.

These transmission and receipt time recordings allow each device to perform the following timing measurements, which can be used to calculate unknown positioning coordinates. Namely, each peer-to-peer device measures and records 606 its frame time offset relative to a reference device. In other words, each peer-to-peer device determines a propagation delay value, e.g. Tprop, which indicates the propagation delay from the reference device to the peer-to-peer device. For one implementation, determining the frame time offset relative to the reference device involves using a signaling procedure to calculate the round-trip delay, such as a random access procedure performed in cellular networks over one or more random access channels.

Each peer-to-peer device also measures and records 608 a time offset, e.g., T_Rx, from the start of its frame to the reception of the one or more peer device signals. In other words, each peer-to-peer device determines and records a first set of timing measurements, with each timing measurement in the set indicating a time difference between the start time of the transmission of the measuring peer-to-peer device and the time of receipt of a different signal in the set of transmissions from the one or more other peer devices.

FIG. 7 shows a partial timing diagram 700, which illustrates example timing relationships or measurements that can be used to derive the propagation delay (and correspondingly an estimate of the distance) between pairs of devices. Illustrated are the timing relationships for a reference device and three peer-to-peer devices, device 1, device 2, and device 3. The timing diagram could include fewer or more devices than is shown.

For this third embodiment, a "reference" device in the group serves as a timing reference for all devices in the group. The device serving as the timing reference can be a WiFi Direct group owner or an LTE D2D synchronization source. Moreover, transmissions from each peer-to-peer device starts at well-defined frame boundaries, and the frame timing is based on the timing provided by the time reference.

An example reference frame 702 from the reference device is shown in diagram 700. For an embodiment, the frames sent from the devices 1, 2, and 3 have a similar structure with similar frame boundaries. Each device 1, 2, and 3 determines and records 606 its propagation delay (Tprop) from the reference device. For instance, device 1 determines and records a frame time offset or propagation delay value Tprop1 relative to the reference device based on a frame sent at time 704 from device 1. Device 2 determines and records a frame time offset or propagation delay value Tprop2 relative to the reference device based on a frame sent at time 710 from device 2. Device 3 determines and records a frame time offset or propagation delay value Tprop3 relative to the reference device based on a frame sent at time 718 from device 3.

Each peer device 1, 2, and 3 also measures and records 608 the time offset (T_Rx) from the start of the device's own frame to a signal received from the other devices. For example, device 1 measures and records: a time offset T_RX_21 from the start 704 of its own frame to a signal received at a time 706 from device 2; and a time offset T_RX_31 from the start 704 of its own frame to a signal received at a time 708 from device 3. Similarly, device 2 measures and records: a time offset T_Rx_12 from the start 710 of its own frame to a signal received at a time 712 from device 1; and a time offset T_Rx_32 from the start 710 of its own frame to a signal received at a time 716 from device 3. Likewise, device 3 measures and records: a time offset T_Rx_13 from the start 718 of its own frame to a signal received at a time 720 from device 1; and a time offset T_RX_23 from the start 718 of its own frame to a signal received at a time 722 from device 2. Other peer devices in a group can similarly calculate Tprop relative to the reference device and T_Rx relative to the other peer devices including, but not limited to, a device 4 shown in FIG. 8.

Returning to the description of the method 600, each peer-to-peer device generates 610 a timing report that includes at least its frame time offset (Tprop) and the timing measurements (T_Rx). The timing report includes, for example, a table with one row for each device in the group and one column for each device in the group, with at least the frame offset and timing measurements of the peer-to-peer device. At block 612, the peer-to-peer devices exchange timing reports. If one or more timing reports are received before a device sends its timing report, then the device creates an updated report by performing a union of the received timing reports and inserting its own measurements. The device then transmits the timing report.

In this manner, each peer-to-peer device sends its propagation delay values (Tprop) and the timing measurements (T_Rx) for propagating to the remaining peer-to-peer devices. Each peer-to-peer device also receives, from at least some of the remaining peer-to-peer devices, their propagation delay values and timing measurements. It should be noted that from for the "first" peer-to-peer device receiving timing measurements from other peer-to-peer devices, some of the received timing measurements indicates a time difference between the start time of a signal transmitted by one of the remaining peer-to-peer devices and a time of receipt of the transmission from the first peer-to-peer device. However, some of the received timing measurements indicate a time difference between the start time of a signal transmitted by one of the remaining peer-to-peer devices, excluding the first peer-to-peer device, and a time of receipt of a signal of another of the remaining peer-to-peer devices.

Each peer-to-peer device can then generate 614 a final timing report with frame time offsets (Tprop) and timing measurements (T_Rx) for multiple devices. Each peer-to-peer device could alternatively or additionally send their data to a server for generating the final timing report or send the final timing report to the server. FIG. 8 illustrates an example final timing report 800 that can be generated using the propagation delay values (Tprop) and timing measurements (T_Rx) determines and propagated by peer-to-peer device 1, 2, 3, and 4. Report 800, which can be stored at each device and/or provided to a server includes 4 columns 802, 804, 806, and 808 and a row 810 the intersection of which indicates the propagation delays Tprop1, Tprop2, Tprop3, Tprop4 measured by each of devices 1, 2, 3, and 4 from the reference device. The report 800 further includes rows 812, 814, 816, and 818, respectively, which indicate the timing measurements determined by each of the devices 1, 2, 3, and 4 with respect to the other three devices.

The peer-to-peer devices and/or a server can use the propagation delay values (Tprop) and timing measurements (T_Rx) in the final timing report, e.g., 800, to determine 616 the unknown positioning coordinates of at least one of the peer-to-peer devices. The device performing the calculations 616 determines which devices are anchors, and determines their positioning coordinates. Accordingly, the unknown positioning coordinates are further determined using known positioning coordinates of multiple devices in the group of devices. Each peer-to-peer device can perform computations to estimate its own and other devices' coordinates.

In general, the above procedure enables each device to determine distance estimates for all pairs of devices. For example, device 1 can discover the distance estimate between devices 2 and 3. Thus, each device can solve for the coordinates of all the devices. In other words, using the propagation delay values and timing measurements, a device can determine a set of one or more device pair propagation delay values using the timing measurements and propagation delay value for all the peer-to-peer devices. Each device pair propagation delay value indicates a propagation delay between different pairs of peer-to-peer devices in the group of devices, and the unknown positioning coordinates are further determined using the set of device pair propagation delay values. Namely, a device can determine, using the set of device pair propagation delay values, a set of distance values indicating distances between the different pairs of peer-to-peer devices in the group of devices, and the unknown positioning coordinates are determined using the set of distance values.

For a particular embodiment, computation of the unknown positioning coordinates includes the following steps. For each pair of peer-to-peer devices, the propagation delay (Tpropji) for a signal sent by a device j to a device 1 can be represented by equation (5):

$$T\text{prop}ji = T\text{prop}i + T\_Rx\_ji - T\text{prop}j, \quad (5)$$

where the values Tpropi, T_Rx_ji and Tpropj are obtained from the most up to date timing report, for device pair (i, j). In equation (5), Tpropi represents the propagation delay from the reference device to the device i, Tpropj represents the propagation delay from the reference device to the device j, and T_Rx_ji represents the timing measurement indicating a time difference between the start time of a signal transmitted by device i and the time of receipt by device i of a signal sent from device j. The distance between the device pair (i, j) can then be estimated from the device pair propagation delay using equation (6):

$$d_{ji} = T\text{prop}ji \times s \quad (6),$$

where s is the speed of light. A set of equations and constraints can then constructed using equation (1) based on the estimated distances and geometric relationships to determine the unknown coordinates of the non-anchor devices. An optimization approach can be used to obtain estimates for the positioning coordinates of the non-anchor devices.

For a particular example, the propagation delay (Tprop21) for a signal sent from device 2 to device 1 (i.e., the time difference between time 710 and 706), is represented by equation (7):

$$T\text{prop}21 = T\text{prop}1 + T\_Rx\_21 - T\text{prop}2 \quad (7).$$

Equation (6) can then be used to estimate the distance between devices 1 and 2 and the estimated distance used to generate an equation in a system of equations used to determine unknown positioning coordinates.

Figure 9:
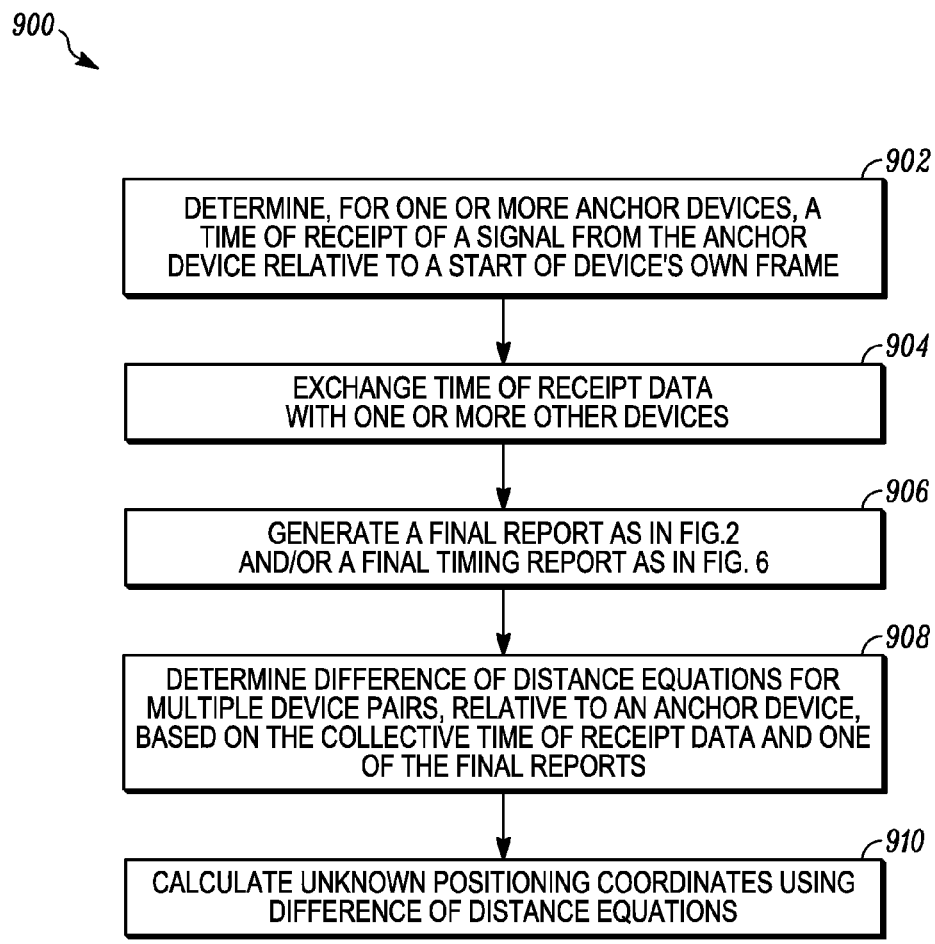
FIG. 9 is a flow diagram illustrating a method for location estimation among peer-to-peer devices in accordance with a fourth embodiment.
Figure 10:
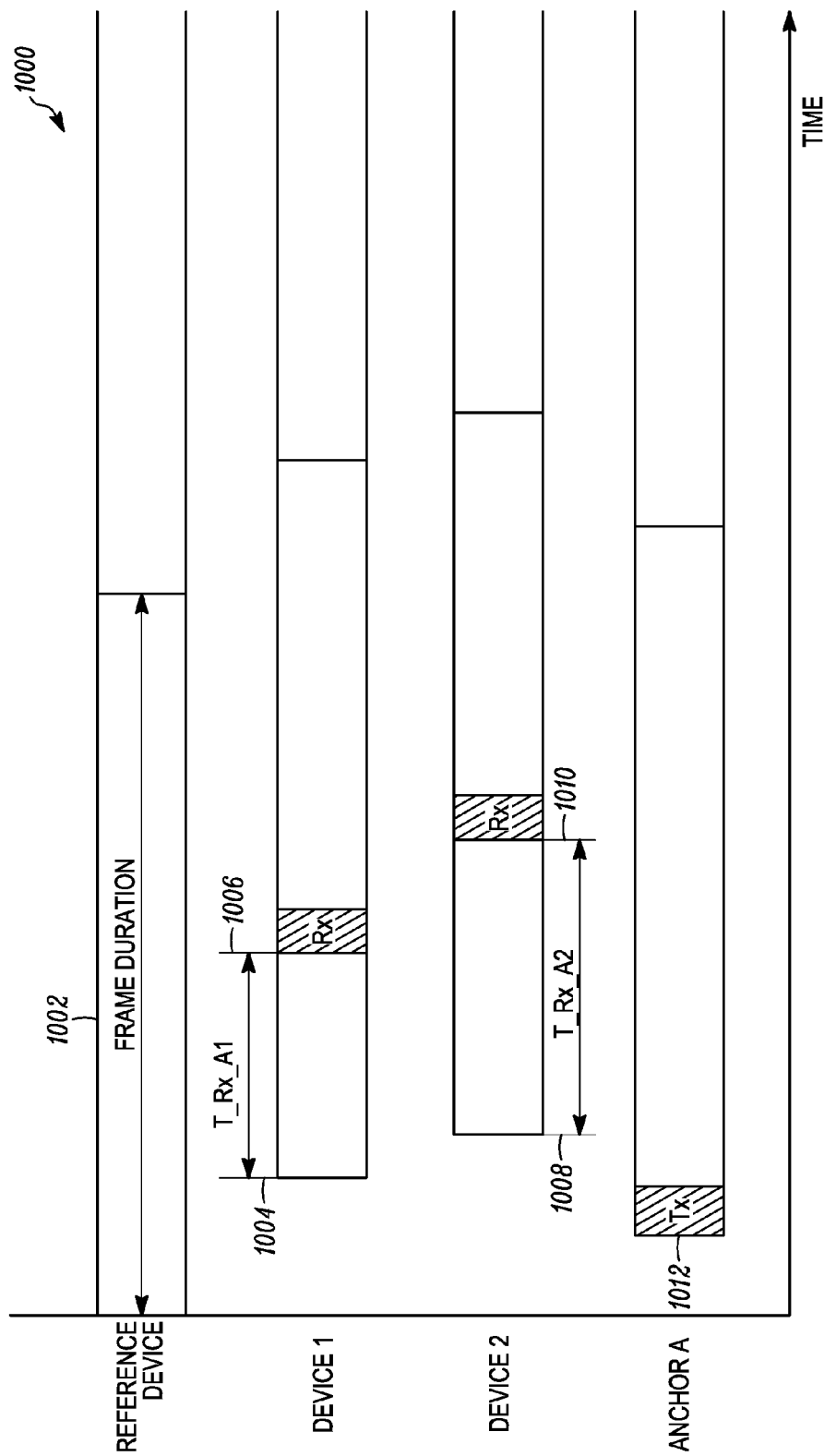
FIG. 10 is a timing diagram illustrating timing data used for performing location estimation among peer-to-peer devices in accordance with the fourth embodiment.

FIGS. 9 and 10 illustrate a fourth embodiment for performing location estimation based on distance difference equations. Estimation of propagation delay to an anchor device may not be possible in many situations. For example, if the anchor device is a WiFi access point, then procedures for calculating round-trip delay are generally not supported by access points. Moreover, even if the access point supports such a procedure, the device needs to be attached to the access point to utilize it. Similarly, if the anchor device is a small cell base station, the device is not allowed to a perform random access procedure on such a base station unless the device is authorized to access the small cell base station. Moreover, performing a random access procedure for positioning purposes can quickly overload the random access channels.

Accordingly, the fourth embodiment uses timing and RSS measurements with respect to an anchor device for multiple pairs of devices to determine the coordinates of the non-anchor devices, without relying on absolute propagation delay estimation to the anchor device. The RSS measurements can be used to estimate distances between pairs of non-anchor devices and to generate corresponding equations and constraints. The timing measurements can be used to estimate differences of distances from a pair of non-anchor devices to a given anchor device and generate corresponding equations. Alternatively, timing measurements between non-anchor devices can be used to estimate distances (propagation delays) between non-anchor devices. With this approach, RSS measurements of non-anchor devices are not necessary.

For this fourth embodiment as well, there is a device in the group that serves as the timing reference for all devices in the group. Additionally, transmissions from each device start at well defined frame boundaries and the frame timing is based on the timing provided by the time reference.

For one implementation example, each peer-to-peer device can perform a method 900 of FIG. 9 to enable the determining of positioning coordinates for one or more non-anchor devices. Each device determines 902 for one or more anchor devices a time of receipt of a signal from the anchor device relative to a start of the devices own frame and exchanges 904 the time of receipt (timing) data with one or more other peer-to-peer devices. This allows the timing measurements, relative to an anchor device, for each peer-to-peer device to be propagated to all of the peer-to-peer devices in the group of devices and used to determine unknown positioning coordinates.

More particularly, each device sends a transmission and records the start time of the transmission and the transmit power used to send the transmission. Each device then receives an anchor signal from an anchor device in the group of devices, wherein positioning coordinates of the anchor device are known. Each device records a timing measurement indicating a time difference between the start time of the transmission and a time of receipt of the anchor signal, and sends the timing measurement and transmit powers for propagation to the remaining peer-to-peer devices. Each device further receives a set of timing measurements and transmit powers from the remaining peer-to-peer devices, each timing measurement in the set indicating a time difference between a start time of a signal sent by a different remaining peer-to-peer device and a time of receipt of the anchor signal.

FIG. 10 shows an illustrative timing diagram 1000 that includes a reference device whose frames, e.g., 1002, serve as a timing reference for peer-to-peer devices 1 and 2. Also illustrated is an anchor device A that transmits a frame 1012. Both devices 1 and 2 measure and record 902 a time difference between transmitting its own frame and receipt of the frame 1012 sent by the anchor device A. Particularly, device 1 measures and records a timing measurement (Tx_Rx_A1), which represents the difference between a time 1004 when device 1 transmits a frame and a time 1006 when device 1 receives frame 1012. Similarly, device 2 measures and records a timing measurement (Tx_Rx_A2), which represents the difference between a time 1008 when device 2 transmits a frame and a time 1010 when device 2 receives frame 1012. The devices 1 & 2 exchange 904 timing measurements Tx_Rx_A1 and Tx_Rx_A2 by sending their respective timing measurement for propagation to all peer-to-peer devices in a peer-to-peer network that includes devices 1 and 2.

Each device further performs, records, and propagates 906 RSS and propagation delay timing measurements, for instance as recorded in reports 300 of FIG. 3 and 800 of FIG. 8, which are used in addition to the anchor timing measurements described by reference to FIG. 10 to determine the unknown positioning coordinates. For a general example, a device determines, as a function of the anchor timing measurements, a set of propagation delay difference values. Each propagation delay difference value indicates, for a different peer-to-peer device pair of the group of devices, a difference in first and second propagation delay values. The first propagation delay value indicates a time of travel of the anchor signal from the anchor device to a first device of the pair, and the second propagation delay value indicates a time of travel of the anchor signal from the anchor device to a second device of the pair. The unknown positioning coordinates are determined using the set of propagation delay difference values.

The device further determines, using the set of propagation delay difference values, a set of distance difference values. Each distance difference value indicates, for a different peer-to-peer device pair of the group of devices, a difference between first and second distances, wherein the first distance is from the first device of the pair to the anchor device and the second distance is from the second device of the pair to the anchor device. The distance difference values are used to construct 908 difference of distance equations for multiple device pairs, relative to an anchor device, based on the RSS or propagation delay timing measurements to calculate 910 unknown positioning coordinates.

For a general example using the propagation delay timing measurements/values, e.g., described by reference to FIGS. 6 to 8, a device (referred to as a first peer-to-peer device) determines a first propagation delay value indicating a propagation delay from a reference device to the first peer-to-peer device and sends the first propagation delay value for propagating to the remaining peer-to-peer devices. The first peer-to-peer device receives a first set of propagation delay values indicating measured propagation delays from the reference device to each of the remaining peer-to-peer devices, wherein the unknown positioning coordinates are further determined using the first set of received propagation delay values. The first peer-to-peer device determines, a set of device pair propagation delay values using the first and second sets of timing measurements, the first propagation delay value, and the first set of propagation delay values, wherein each device pair propagation delay value indicates a propagation delay between different peer-to-peer device pairs in the group of devices. The set of propagation delay difference values, ultimately used to construct the difference of distance equations, is determined based on the set of device pair propagation delay values.

For another general example using the RSS measurements, e.g., described by reference to FIGS. 2 and 3, the first peer-to-peer device records and propagates a first transmit power value used to send its transmission and also receives a second set of transmit power values recorded by the remaining peer-to-peer devices. The first peer-to-peer device determines, for each peer-to-peer device pair and using the first and second sets of received signal strength measurements, the first and second sets of time stamps, the first transmit power value, and the second set of transmit power values, a difference between a correlated transmit value and received signal strength measurement for a signal sent between the first and second devices of the pair. The first peer-to-peer device further determines, for each peer-to-peer device pair and using the difference between the correlated transmit value and received signal strength measurement, a device pair propagation delay value. The set of propagation delay difference values, ultimately used to construct the difference of distance equations, is determined using the device pair propagation delay values.

For a particular example consistent with the previously described embodiments, each first peer-to-peer device performs RSS measurements as described by reference to FIG. 2 for the first embodiment and/or timing measurements as described by reference to FIG. 6 for the third embodiment. The device transmits the level 1 measurement report (e.g., shown in FIG. 3) and/or the timing report (e.g., shown in FIG. 8). If a device receives one or more level 1 reports prior to transmitting its level 1 report, it performs unions of the measurement reports and timing reports in the messages, inserts its measurements into the reports and transmits it as its level 1 report.

Each device that receives a level 1 report performs the following. If there is an entry in the level 1 report corresponding to a measurement of its transmission, it fills in the transmit power that was used for transmission of its signal as indicated by the timestamp. The device then transmits the updated measurement report and the timing report as level 2 reports. If the device receives one or more level 2 reports before transmitting its level 2 report, it performs unions as above and then updates and sends the level 2 report. Each device determines which of its peers are anchors, and determines the coordinates of those anchors.

Each device then performs computations to estimate its coordinates. The details of this procedure are described below. This procedure enables each device to know: distance estimates between pairs of devices that are not anchors, based for instance on the RSS measurements and the transmit powers or propagation delay timing measurements; and differences of distances to a given anchor device, based on the anchor time offset measurements.

Computation of the positioning coordinates of the non-anchor devices can include the following steps. A device pair (D1, D2) and an anchor device A are identified such that the following measurements are available: time offset measurements (e.g., T_Rx_A1 and T_Rx_A2 of FIG. 10) performed by both D1 and D2 of A; and at least one of an RSS measurement of D1 performed by D2 and the corresponding transmit power of D1, or an RSS measurement of D2 performed by D1 and the corresponding transmit power of D2, or a propagation delay timing measurements performed by devices D1 and D2.

For each such (D1, D2, A) an equation is generated as follows. A computation of difference in propagation delay from an anchor A to a device D2 and the anchor A to a device D1 is illustrated by reference to FIG. 10 and is calculated using the following equation (8):

$$\Delta \text{Prop}_{D2,D1}{}^{A} = T_{D1,D2} + T\_Rx\_A2 - T\_Rx\_A1, \qquad (8)$$

where $\Delta \text{Prop}_{D2,D1}{}^{A}$ denotes the difference in propagation delay from A to D2 and from A to D1, T_Rx_A1 represents a difference in time from when D1 sends a signal (in this case the start of a frame) to a time of receipt of an "anchor" signal from anchor A, T_Rx_A2 represents a difference in time from when D2 sends a signal to a time of receipt of the anchor signal from anchor A, and $T_{D1,D2}$ denotes the propagation delay from D1 to D2.

For a first approach, $T_{D1,D2}$ can be estimated based on equation (2) using RSS and transmit power data similar to that illustrated in FIG. 3. Particularly, RSS measurements between D1 and D2 are used to estimate the distance $d_{D1,D2}$ between D1 and D2 using equation (2). The propagation delay estimate between D1 and D2, $T_{D1,D2}$, is calculated from $d_{D1,D2}$. For a second approach, propagation delay timing measurements between non-anchor devices, e.g., as illustrated by reference to FIGS. 7 and 8, can be used to estimate distances (propagation delays) between non-anchor devices, and RSS measurements of non-anchor devices are not necessary. If this approach is taken, $T_{D1,D2}$=Tprop1+ T_Rx_21−Tprop2, in accordance with equation (5), and equation (7) becomes:

$$\Delta \text{Prop}_{D2,D1}{}^{A} = T\text{prop}1 + T\_Rx\_21 - T\text{prop}2 + T\_Rx\_A2 - T\_Rx\_A1 \qquad (9).$$

Distance $\Delta_{D1,D2}$ is calculated from $\Delta \text{Prop}_{D2,D1}{}^{A}$ using equation (6). Let $(x_{D1}, y_{D1})$ and $(x_{D2}, y_{D2})$ be the (unknown) coordinates of D1 and D2. Let $(x_A, y_A)$ be the coordinates of A. The equation to be satisfied is written as:

$$\sqrt{(x_{D1} - x_A)^2 + (y_{D1} - y_A)^2} - \sqrt{(x_{D2} - x_A)^2 + (y_{D2} - y_A)^2} - \Delta_{D1,D2} = 0 \qquad (10)$$

An optimization approach is used to obtain estimates for the coordinates of the non-anchor devices.

Figure 11:
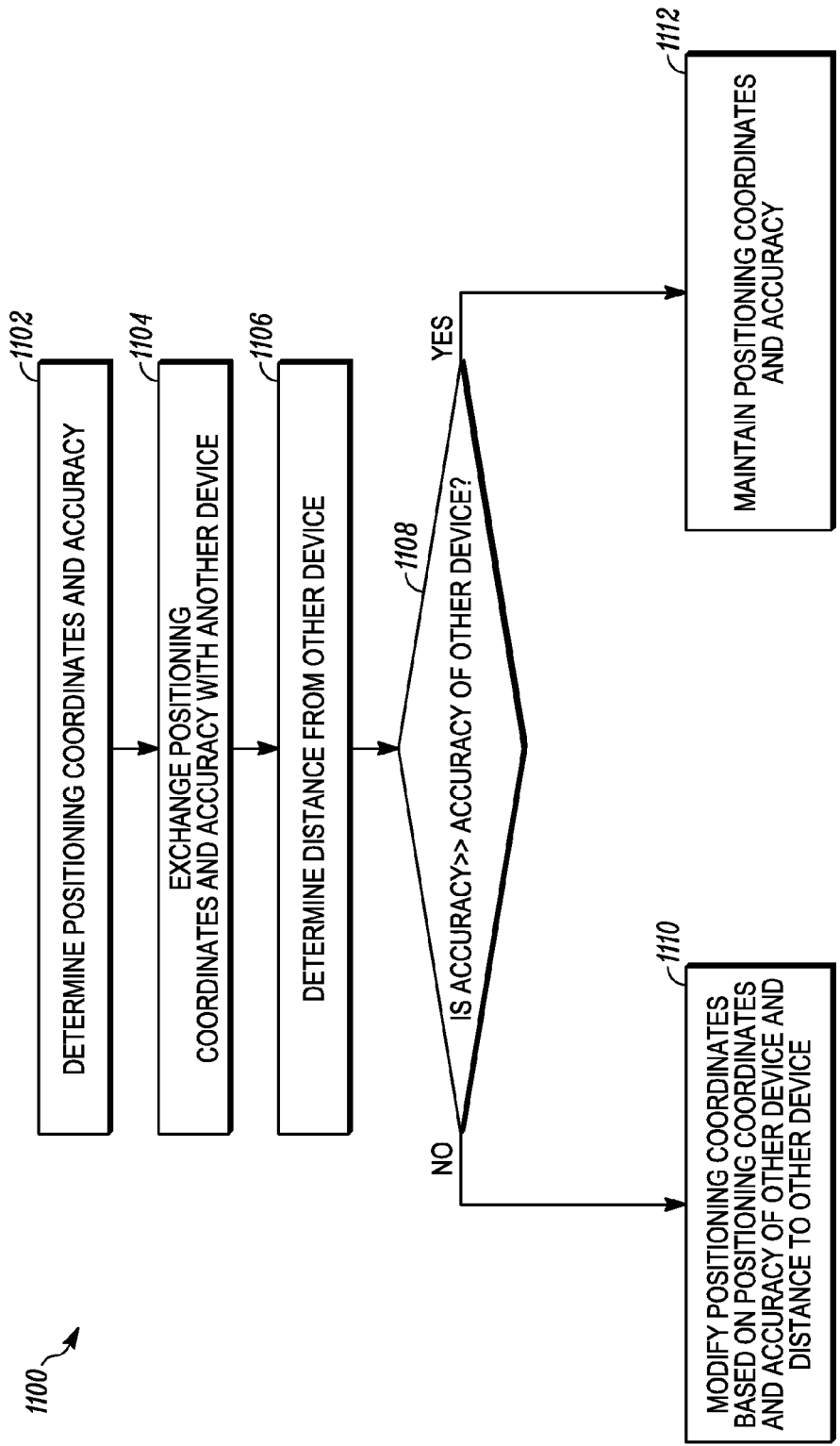
FIG. 11 is a flow diagram illustrating a method for location estimation among peer-to-peer devices in accordance with a fifth embodiment.

FIG. 11 depicts a flow diagram illustrating a fifth embodiment (method 1100) for location estimation among anchor devices, for instance having peer-to-peer connections. In one use case scenario, this location estimation mechanism is used to fine-tune the known coordinates of one or more anchor devices whose coordinates are used in the non-anchor coordinate calculations for the embodiments described above by reference to FIGS. 2-10. This could lend even further accuracy and optimization to those systems of equations. However, this embodiment is not limited to that example scenario. Moreover, although the description of the method 1100 is described by reference to absolute positioning coordinates, the method generally applies to any location indication and corresponding location accuracy.

For one implementation, each anchor device in a pair of anchor devices performs the method 1100. For example, the anchor device A1 determines 1102 its positioning coordinates, e.g., GPS coordinates (x1, y1), and location accuracy, also simply referred to herein as an accuracy. The accuracy in one embodiment represents an accuracy radius r1. Some smartphones, for instance, that utilize a GPS receiver or module can also calculate and display an accuracy figure such as an Estimated Position Error (EPE), which corresponds to a confidence circle having the accuracy radius r1.

A1 exchanges 1104 its GPS coordinates and accuracy radius with another device, e.g., A2 having GPS coordinates of (x2, y2) and a location accuracy represented as an accuracy radius r2. The coordinate and accuracy exchange can be performed using a device-to-device communication mechanism, such as WiFi Direct standard or LTE Direct for example.

A1 estimates 1106 its distance from A2, also referred to herein as a pairwise distance. A1 estimates distance, for example, using RSS measurements of A2 (as in the first and second embodiments of the present teachings described by reference to FIGS. 2 to 5) or using timing measurements (as in the third and fourth embodiments described by reference to FIGS. 7 to 10). Alternatively, A1 can estimate its distance from A2 using nearby anchor devices such as WiFi access points whose location in a local coordinate system is known. The distance calculation 1106 can be performed using any other suitable algorithm or methodology.

A1 further compares 1108 its accuracy radius A1 with that of A2. Where r1 is larger than r2 (A1 has less accurate GPS coordinates than A2), for example an order of a magnitude larger thereby possibly degrading accuracy by hundreds of meters, A1 modifies 1110 its GPS coordinates based on (x2,y2), r2 and the calculated distance. For example, the modified location estimate of A1 is (x2, y2) with an accuracy radius of d+r2. However, the threshold for triggering A1 to modify its positioning coordinates can be set as desired. Otherwise, A1 maintains 1112 its GPS coordinates and accuracy. Similarly, where r1<<r2, the modified location estimate of A2 is (x1, y1) with an accuracy radius of d+r1.

Figure 12:
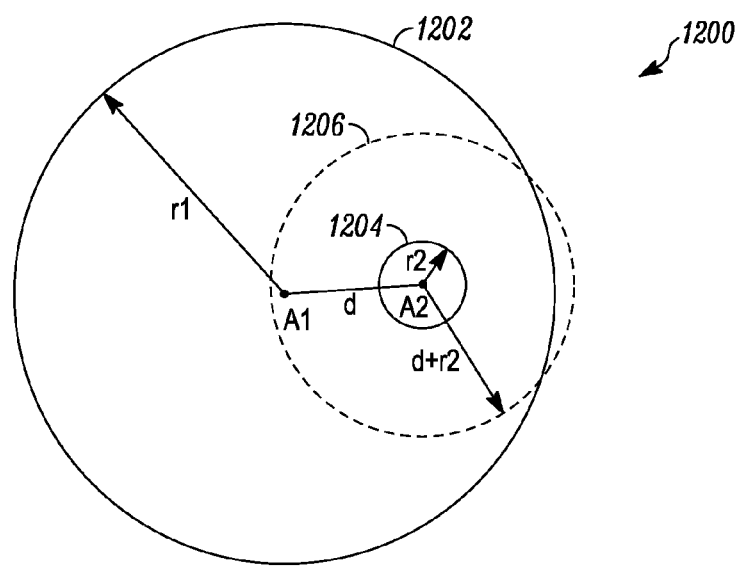
FIG. 12 is a set of diagrams illustrating performing location estimation among peer-to-peer devices in accordance with a fifth embodiment.
Figure 12:
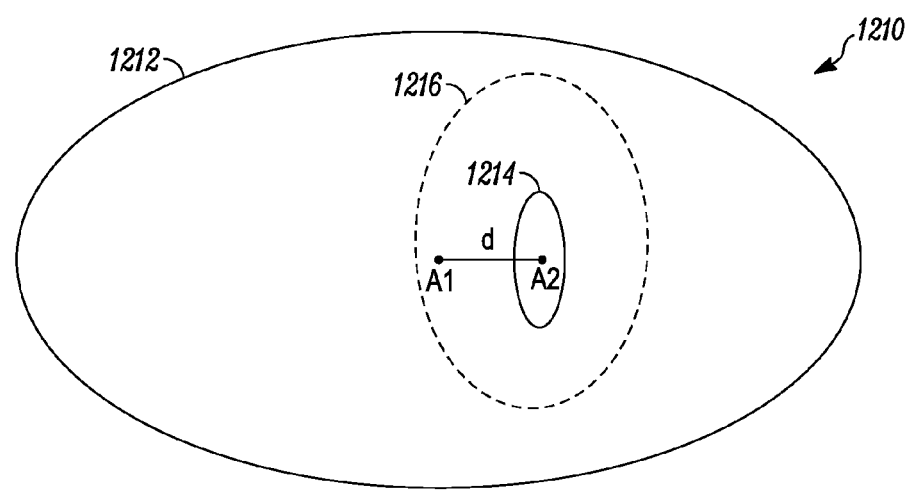

FIG. 12 illustrates a diagram 1200, which shows the location of A1 as a point in the center of an accuracy circle 1202 having an accuracy radius of r1. Thus, the circle 1202 is an accuracy shape of and including positioning coordinates representing all the possible locations of A1. Similarly, diagram 1200 shows the location of A2 as a point in the center of an accuracy circle 1204 having an accuracy radius of r2. Thus, the circle 1204 is an accuracy shape of and including positioning coordinates representing all the possible locations of A2. A1 and A2 are shown as separated by a distance d. Since the location accuracy r2 is better (i.e., a smaller radius) than the location accuracy r1, the updated coordinates of A1 are set to those of A2; and the updated accuracy for these updated coordinates for A1 is a radius equal to d+r2 of an accuracy circle 1206 of which the positioning coordinates of A1 are now the center. Thus, using the method 1100, the possible locations of A1 are reduced to only the positioning coordinates within the smaller circle 1206.

The accuracy radius used above is a simple measure of accuracy. However, other accuracy measures are possible. If the accuracy is represented as a different shape, the accuracy shape corresponding to the modified location estimate of the A2 (for instance) can be obtained as described by reference to diagram 1210 of FIG. 12. Diagram 1210 shows the location of A1 as a point in the center of an accuracy ellipse 1212 of and including positioning coordinates representing all the possible locations of A1. Similarly, diagram 1210 shows the location of A2 as a point in the center of an accuracy ellipse 1214 of and including positioning coordinates representing all the possible locations of A2. A1 and A2 are shown as separated by a distance d.

Since the location accuracy for A2 is better than for A1, as shown by the smaller area of its accuracy shape, the location indication and location accuracy of A1 is updated based on the location indication for A2, the accuracy shapes for A1 and A2, and d. More particularly, device A1 performs a union of accuracy shapes formed by moving A1 to all points that are at a distance d from (x2,y2); thus, A1 at these different distances becomes the center of a corresponding different accuracy. A1 further performs and intersection of the accuracy shape D1 with the union of the plurality of accuracy shapes to form an updated accuracy shape 1216 for A1. The new location estimate for A1 can be the coordinates corresponding to the center-of-mass of the accuracy shape 1216.

Accordingly, for both implementations illustrated by reference to diagrams 1200 and 1210, the method 1100 includes a each device, e.g., A1 and A2, acting as a "first" device performing: determining 1102 a first location indication and a first location accuracy for the first device; receiving (1104) a second location indication and a second location accuracy for a second device having a peer-to-connection to the first device; comparing (1108) the first and second location accuracies; determining (1110) an updated location indication and an updated location accuracy for the first device when the second location accuracy is better than the first location accuracy, wherein the updated location indication and updated location accuracy are determined based at least on the second location indication and the second location accuracy. Additionally, for both implementations, the updated location accuracy is determined based on an estimate of a pairwise distance between the first and second devices.

For the first implementation illustrated by reference to diagram 1200, the first location accuracy represents a first radius and the second location accuracy represents a second radius. Moreover, the updated location indication and updated location accuracy are determined when the second radius is smaller than the first radius.

For the second implementation illustrated by reference to diagram 1210, the updated location accuracy includes updated positioning coordinates determined based on the second location indication, the first and second location accuracies, and the estimated pairwise distance. More particularly, the first location accuracy is a first accuracy shape (1212) of positioning coordinates having the first location indication as a first centroid; and the second location accuracy is a second accuracy shape (1214) of positioning coordinates having the second location indication as a second centroid. The method performed in the first device to obtain 1110 the updated positioning coordinates and accuracy further includes forming a union of a plurality of accuracy shapes having a corresponding plurality of centroids each determined by moving a different positioning coordinate, of the second accuracy shape, by the estimated pairwise distance. The first device further intersects the first accuracy shape and the union of the plurality of accuracy shapes to form an updated accuracy shape (1216) of the updated positioning coordinates. The updated location indication is the centroid of the updated accuracy shape.

Figure 13:
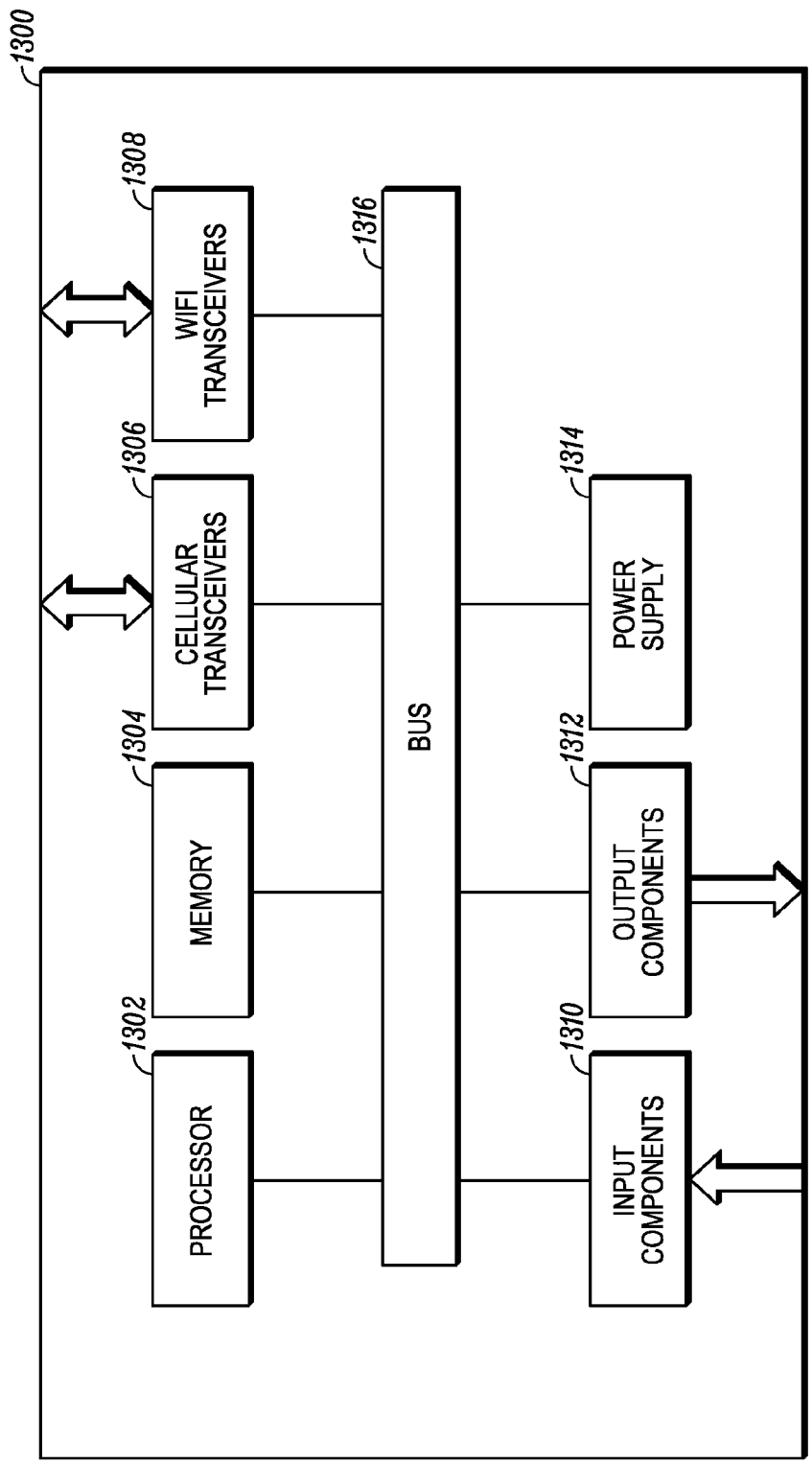
FIG. 13 is a block diagram illustrating some internal hardware components of a device configured for performing location estimation among peer-to-peer devices in accordance with some embodiments.

FIG. 13 shows a block diagram of internal hardware components 1300 of a device configured to perform location estimation among peer-to-peer devices in accordance some embodiments, for instance as explained above by reference to FIGS. 2 through 12. Components 1300 can be included within any type of device to which the teachings herein can be applied including, but not limited to, any one of the devices A1, A2, A3, U1, U2, U3 shown in FIG. 1. For some examples, devices containing components 1300 can be smartphones, personal digital assistants (PDAs), audio- and video-file players (e.g., MP3 players), personal computing devices such as tablets, and wearable electronic devices, such as devices worn with a wristband.

The components 1300 include a processor 1302, memory 1304, one or more cellular transceivers 1306, one or more wireless local area network, e.g., WiFi transceivers 1308, input components 1310, output components 1312, and a power supply 1314, which are all operationally interconnected by a bus 1316. A limited number of device components 1302, 1304, 1306, 1308, 1310, 1312, 1314, and 1316 are shown for ease of illustration. Other embodiments may include a lesser or greater number of components in a device. Moreover, other components needed for a commercial embodiment a device that incorporates the components 1300 are omitted from FIG. 13 for clarity in describing the enclosed embodiments.

In general, the processor 1302 is configured with functionality in accordance with embodiments of the present disclosure as described herein with respect to FIGS. 2 through 12. "Configured," "adapted," "operative," or "capable," as used herein, means that indicated components are implemented using one or more hardware elements, such as one or more operatively coupled processing cores, memory elements, and interfaces, which may or may not be programmed with software and/or firmware, as the means for the indicated components to implement their desired functionality. Such functionality is supported by the other hardware shown in FIG. 13, including the device components 1304, 1306, 1308, 1310, 1312, and 1314, which are all operatively interconnected with the processor 1302 by the bus 1316. The processor, for instance, includes arithmetic logic and control circuitry necessary to perform the digital processing, in whole or in part, for a device to perform location estimation among peer-to-peer devices in accordance with described embodiments. For one embodiment, the processor 1302 represents a primary microprocessor, also referred to as a central processing unit (CPU), of the device. For example, the processor 1302 can represent an application processor of a tablet. In another embodiment, the processor 1302 is an ancillary processor, separate from the CPU, wherein the ancillary processor is dedicated to providing the processing capability, in whole or in part, needed for the components of the device to perform at least some of their intended functionality.

The memory 1304 provides storage of electronic data used by the processor 1302 in performing its functionality. For example, the processor 1302 can use the memory 1304 to store data structures similar to those described by reference to FIGS. 3, 5, and 8 and other data not shown in the data structures 300, 500, and 800 therein but that are, nonetheless, used to implement the present teachings. In one embodiment, the memory 1304 represents random access memory (RAM). In other embodiments, the memory 1304 represents volatile or non-volatile memory. For a particular embodiment, a portion of the memory 1304 is removable.

The transceivers 1306 and 1308 allow for communication between the device and other devices, such as mobile devices, WiFi access points, or cellular base stations, configured to support the device performing its described functionality. Particularly, the cellular transceivers 1306 enable the device to communicate with other devices using one or more cellular networks. Cellular networks can use any wireless technology that, for example, enables broadband and Internet Protocol (IP) communications including, but not limited to, $3^{rd}$ Generation (3G) wireless technologies such as CDMA2000 and Universal Mobile Telecommunications System (UMTS) networks or $4^{th}$ Generation (4G) wireless networks such as LTE and WiMAX.

The WiFi transceiver 1308 allows the device to access the Internet to send and receive radio signals to and from similarly equipped devices using a wireless distribution method, such as a spread-spectrum or orthogonal frequency-division multiplexing (OFDM) method. In a particular embodiment, WiFi the WiFi transceiver 1308 uses interoperability standards as specified by the WiFi Alliance to communicate with other WiFi certified devices. For other embodiments, the transceiver 1308 uses an IEEE 802.11 standard to communicate with other devices in the 2.4, 3.6, 5, and 60 GHz frequency bands.

The input component 1310 and the output component 1312 represent user-interface components of the device configured to allow a person to use, program, or otherwise interact with the device. Different devices for different embodiments include different combinations of input 1310 and output 1312 components. A touchscreen, for example, functions both as an output component and an input component for some embodiments by allowing a user to see displayed view elements for a mobile application and to actuate the view elements by tapping on them. Peripheral devices for other embodiments, such as keyboards, mice, and touchpads, represent input components that enable a user to interact with devices such as tables. A speaker is an example output component 1312. Embodiments further include an acoustic transducer, such as a microphone, as an input component 1310 that converts received acoustic signals into electronic signals, which can be encoded, stored, and processed for voice recognition.

The power supply 1314 represents a power source that supplies electric power to the device components 1302, 1304, 1306, 1308, 1310, 1312, and 1316, as needed, during the course of their normal operation. The power is supplied to meet the individual voltage and load requirements of the device components 1302, 1304, 1306, 1308, 1310, 1312, and 1316 that draw electric current. For some embodiments, the power supply 1314 is a wired power supply that provides direct current from alternating current using a full- or half-wave rectifier. For other embodiments, the power supply 1314 is a battery that powers up and runs a mobile device. For a particular embodiment, the battery 1314 is a rechargeable power source. A rechargeable power source for a device is configured to be temporarily connected to another power source external to the device to restore a charge of the rechargeable power source when it is depleted or less than fully charged. In another embodiment, the battery is simply replaced when it no longer holds sufficient charge.

The components 1300 can be configured to perform functionality consistent with the teachings herein including teachings consistent with the embodiments described above by reference to FIGS. 2 to 12. For one example implementation, a first peer-to-peer device includes a processor 1302 and set of transceivers 1306, 1308 operatively coupled and configured to perform a method consistent with the third embodiment described by reference to FIGS. 6 to 8. Particularly, the device is configured to send 602 a transmission and record 602 a start time of the transmission. The device is also configured to receive 604 a set of signals sent from remaining peer-to-peer devices in a group of devices that also includes the first peer-to-peer device. The device is configured to record 608 a first set of timing measurements each indicating a time difference between the start time of the transmission and a time of receipt of a different signal of the set of signals and send 612 the first set of timing measurements for propagating to the remaining peer-to-peer devices. The device is further configured to receive 612 from the remaining peer-to-peer devices a second set of timing measurements each indicating a time difference between a start time of a signal transmitted by one of the remaining peer-to-peer devices and a time of receipt of a signal sent from another of the peer-to-peer devices in the group of devices. The device is configured to determine 614, 616 unknown positioning coordinates for at least one peer-to-peer device in the group of devices using the first and second sets of timing measurements.

For another example implementation, a first peer-to-peer device includes a processor 1302 and set of transceivers 1306, 1308 operatively coupled and configured to perform a method consistent with the first embodiment described by reference to FIGS. 2 and 3. Particularly, the device: takes 202 a first set of received signal strength measurements for a first set of signals received from at least one device within a group of devices that includes the first peer-to-peer device and a remaining number of peer-to-peer devices; records 204 a first set of time stamps that indicate when the first set of received signal strength measurements were taken; and sends 206 sending the first set of received signal strength measurements and corresponding first set of time stamps for propagating to the remaining peer-to-peer devices. The device determines 216 unknown positioning coordinates for at least one peer-to-peer device in the group of devices using at least the first and second sets of received signal strength measurements and the first and second sets of time stamps. The determining includes correlating the measurements in the first and second sets of received signal strength measurements using the first and second sets of time stamps to define constraints on distances between pairs of devices in the group of devices.

Additionally, the device: sends 210 a second set of signals; records 210 a first set of transmit power values used to send the second set of signals; records 210 a third set of timestamps that indicate when the second set of signals was sent; and sends 212 the first set of transmit power values for propagating to the remaining peer-to-peer devices. The unknown positioning coordinates are further determined using the first set of transmit power values and the third set of timestamps. The device further receives 214 a second set of transmit power values recorded by the remaining peer-to-peer devices, and the unknown positioning coordinates are determined using the second set of transmit power values.

More particularly, correlating the measurements in the first and second sets of received signal strength measurements using the first and second sets of time stamps includes the device: comparing 210 the received second set of time stamps to the recorded third set of time stamps to determine a first subset of the second set of received signal strength measurements that were taken for the second set of signals; recording 212 first correlations, between the first set of transmit power values and the first subset of the second set of received signal strength measurements, for a first set of peer-to-peer device pairs that each include the first peer-to-peer device; and sending 212 an indication of the first correlations for the first set of peer-to-peer device pairs for propagating to the remaining peer-to-peer devices. Correlating the measurements in the first and second sets of received signal strength measurements using the first and second sets of time stamps further includes the device: receiving 214 an indication of second correlations, between a first subset of the second set of transmit power values and the first set of received signal strength measurements, for a second set of peer-to-peer device pairs that each include the first peer-to-peer device; and receiving 214 an indication of third correlations, between a remaining second subset of the second set of transmit power values and a remaining second subset of the second set of received signal strength measurements, for a third set of peer-to-peer device pairs that include the remaining peer-to-peer devices excluding the first peer-to-peer device.

The unknown positioning coordinates are determined 216 using the first, second, and third correlations. Particularly, the device determines a distance between the devices of each peer-to-peer device pair, associated with the first, second, and third correlations, as a function of a difference between the correlated transmit power value and received signal strength measurement for each peer-to-peer device pair, and the unknown positioning coordinates are determined based on the distances. For a specific implementation, the function is $TX-RSS=10n \log_{10} d$, where TX is the transmit power, RSS is the correlated received signal strength measurement, d is the distance, and n is a path-loss exponent.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method performed by a first peer-to-peer device, the method comprising:
    taking a first set of received signal strength measurements for a first set of signals received from at least one device within a group of devices that includes the first peer-to-peer device and a remaining number of peer-to-peer devices;
    recording a first set of time stamps that indicate when the first set of received signal strength measurements were taken;
    sending the first set of received signal strength measurements and corresponding first set of time stamps for propagating to the remaining peer-to-peer devices;
    receiving a second set of received signal strength measurements taken by the remaining peer-to-peer devices and a second set of time stamps that indicate when the second set of received signal strength measurements were taken;
    determining unknown positioning coordinates for at least one peer-to-peer device in the group of devices using at least the first and second sets of received signal strength measurements and the first and second sets of time stamps, wherein the determining comprises correlating the measurements in the first and second sets of received signal strength measurements using the first and second sets of time stamps to define constraints on distances between pairs of devices in the group of devices; and
    wherein correlating the measurements in the first and second sets of received signal strength measurements using the first and second sets of time stamps comprises comparing the first set of time stamps to the second set of time stamps to identify multiple device trios each having a different combination of first, second, and third devices of the group of devices, wherein the first and second devices took overlapping received signal strength measurements of a signal sent by the third device, wherein the unknown positioning coordinates are further determined using the overlapping received signal strength measurements associated with each identified device trio.

2. The method of claim 1, wherein correlating the measurements in the first and second sets of received signal strength measurements using the first and second sets of time stamps comprises comparing the first set of time stamps and the second set of time stamps to identify received signal strength measurements that overlap in time, wherein the overlapping measurements are taken for a signal sent from a second peer-to-peer device and are taken by two or more of the other peer-to-peer devices, wherein constraints on distances between the second peer-to-peer device and the two or more of the other peer-to-peer devices are defined using the overlapping measurements.

3. The method of claim 1, wherein the second set of received signal strength measurements includes measurements taken by one or more of the remaining peer-to-peer devices of signals sent by one or more of the other remaining peer-to-peer devices.

4. The method of claim 1, wherein the unknown positioning coordinates are further determined using known positioning coordinates of multiple devices in the group of devices.

5. The method of claim 1 further comprising:
    sending a second set of signals;
    recording a first set of transmit power values used to send the second set of signals;
    recording a third set of timestamps that indicate when the second set of signals was sent;
    sending the first set of transmit power values for propagating to the remaining peer-to-peer devices;
    wherein the unknown positioning coordinates are further determined using the first set of transmit power values and the third set of timestamps.

6. The method of claim 5 further comprising receiving a second set of transmit power values recorded by the remaining peer-to-peer devices, wherein the unknown positioning coordinates are further determined using the second set of transmit power values.

7. The method of claim 6, wherein correlating the measurements in the first and second sets of received signal strength measurements using the first and second sets of time stamps comprises:

comparing the received second set of time stamps to the recorded third set of time stamps to determine a first subset of the second set of received signal strength measurements that were taken for the second set of signals;

recording first correlations, between the first set of transmit power values and the first subset of the second set of received signal strength measurements, for a first set of peer-to-peer device pairs that each include the first peer-to-peer device;

sending an indication of the first correlations for the first set of peer-to-peer device pairs for propagating to the remaining peer-to-peer devices;

receiving an indication of second correlations, between a first subset of the second set of transmit power values and the first set of received signal strength measurements, for a second set of peer-to-peer device pairs that each include the first peer-to-peer device;

receiving an indication of third correlations, between a remaining second subset of the second set of transmit power values and a remaining second subset of the second set of received signal strength measurements, for a third set of peer-to-peer device pairs that include the remaining peer-to-peer devices excluding the first peer-to-peer device;

wherein the unknown positioning coordinates are determined using the first, second, and third correlations.

8. The method of claim 7 further comprising determining a distance between the devices of each peer-to-peer device pair, associated with the first, second, and third correlations, as a function of a difference between the correlated transmit power value and received signal strength measurement for each peer-to-peer device pair, wherein the unknown positioning coordinates are determined based on the distances.

9. The method of claim 8, wherein the function is TX−RSS=$10n \log_{10}d$, where TX is the transmit power, RSS is the correlated received signal strength measurement, d is the distance, and n is a path-loss exponent.

10. The method of claim 1 further comprising:
sending a transmission;
recording the start time of the transmission;
receiving an anchor signal from an anchor device in the group of devices, wherein positioning coordinates of the anchor device are known;
recording a first timing measurement indicating a time difference between the start time of the transmission and a time of receipt of the anchor signal;
sending the first timing measurement for propagation to the remaining peer-to-peer devices;
wherein the unknown positioning coordinates are further determined using the first timing measurement.

11. The method of claim 10 further comprising:
receiving a set of timing measurements from the remaining peer-to-peer devices, each timing measurement in the set indicating a time difference between a start time of a signal sent by a different remaining peer-to-peer device and a time of receipt of the anchor signal;
wherein the unknown positioning coordinates are further determined using the set of received timing measurements.

12. The method of claim 11 further comprising:
determining, as a function of the first timing measurement and the set of received timing measurements, a set of propagation delay difference values with each propagation delay difference value indicating, for a different peer-to-peer device pair of the group of devices, a difference in first and second propagation delay values, wherein the first propagation delay value indicates a time of travel of the anchor signal from the anchor device to a first device of the pair, and the second propagation delay value indicates a time of travel of the anchor signal from the anchor device to a second device of the pair;
wherein the unknown positioning coordinates are determined using the set of propagation delay difference values.

13. The method of claim 12 further comprising:
determining, using the set of propagation delay difference values, a set of distance difference values with each distance difference value indicating, for a different peer-to-peer device pair of the group of devices, a difference between first and second distances, wherein the first distance is from the first device of the pair to the anchor device and the second distance is from the second device of the pair to the anchor device;
wherein the unknown positioning coordinates are determined using the set of distance difference values.

14. The method of claim 12 further comprising:
recording a first transmit power value used to send the transmission;
receiving a second set of transmit power values recorded by the remaining peer-to-peer devices;
determining, for each peer-to-peer device pair and using the first and second sets of received signal strength measurements, the first and second sets of time stamps, the first transmit power value, and the second set of transmit power values, a difference between a correlated transmit value and received signal strength measurement for a signal sent between the first and second devices of the pair,
determining, for each peer-to-peer device pair and using the difference between the correlated transmit value and received signal strength measurement, a device pair propagation delay value;
wherein the set of propagation delay difference values is determined using the device pair propagation delay values.

15. The method of claim 1, wherein the unknown positioning coordinates are determined based on a difference between the overlapping received signal strength measurements associated with each identified device trio.

16. The method of claim 15 further comprising determining, for each identified device trio and as a function of the difference between the overlapping received signal strength measurements, a distance ratio of a distance between the second and third devices to a distance between the first and third devices, wherein the unknown positioning coordinates are further determined based on the distance ratios.

17. The method of claim 16, wherein the function is $\Delta RSS_{D3}=10n \log_{10}(d_{23}/d_{13})$, where $\Delta RSS_{D3}$ is the difference between the overlapping received signal strength measurements, $d_{23}/d_{13}$ is the distance ratio, and n is a path-loss exponent.

* * * * *